US012559609B2

(12) United States Patent
Dotson et al.

(10) Patent No.: US 12,559,609 B2
(45) Date of Patent: Feb. 24, 2026

(54) POLYETHYLENE POLYMER COMPOSITIONS AND ARTICLES MADE FROM THE SAME

(71) Applicant: Milliken & Company, Spartanburg, SC (US)

(72) Inventors: Darin Dotson, Moore, SC (US); Walter Forrister, Inman, SC (US); Xiaoyou Xu, Spartanburg, SC (US); Hua Sun, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 912 days.

(21) Appl. No.: 17/726,508

(22) Filed: Apr. 21, 2022

(65) Prior Publication Data

US 2022/0348740 A1 Nov. 3, 2022

Related U.S. Application Data

(60) Provisional application No. 63/178,217, filed on Apr. 22, 2021.

(51) Int. Cl.
*C08K 5/5317* (2006.01)

(52) U.S. Cl.
CPC ...... *C08K 5/5317* (2013.01); *C08K 2201/006* (2013.01)

(58) Field of Classification Search
CPC ........... C08L 23/00; C07F 9/38; C08K 5/5317
See application file for complete search history.

(56) References Cited

U.S. PATENT DOCUMENTS

| | | | | |
|---|---|---|---|---|
| 4,174,340 | A | 11/1979 | Burg | |
| 4,972,011 | A | 11/1990 | Richardson | |
| 7,199,172 | B2 | 4/2007 | Rule | |
| 8,835,542 | B2 | 9/2014 | Connor | |
| 9,018,413 | B2 | 4/2015 | Hill | |
| 9,745,449 | B2 | 8/2017 | Stockdale | |
| 9,752,011 | B2 | 9/2017 | Stockdale | |
| 9,765,204 | B2 | 9/2017 | Timberlake | |
| 2002/0037386 | A1* | 3/2002 | Bonke | B32B 27/32 428/40.1 |
| 2003/0139546 | A1* | 7/2003 | Jain | C08L 23/0815 525/240 |
| 2006/0138391 | A1 | 6/2006 | Drewes | |
| 2009/0198011 | A1 | 8/2009 | Dangayach | |
| 2012/0043692 | A1 | 2/2012 | Connor | |
| 2017/0166430 | A1* | 6/2017 | Wang | B67C 3/22 |
| 2019/0136028 | A1 | 5/2019 | Xie | |

FOREIGN PATENT DOCUMENTS

| | | | |
|---|---|---|---|
| EP | 0245207 | A2 | 11/1987 |
| EP | 1739122 | A1 | 1/2007 |
| EP | 3214118 | A1 | 9/2017 |
| JP | 07258477 | A | 10/1995 |
| WO | 2010126559 | A1 | 11/2010 |
| WO | 2011106177 | A1 | 9/2011 |
| WO | 2016014113 | A1 | 1/2016 |
| WO | WO-2020003048 | A1 * | 1/2020 |

OTHER PUBLICATIONS

International Search Report and Written Opinion issued in App. No. PCT/US2022/025850, dated Jul. 19, 2022, 11 pages.
International Search Report and Written Opinion issued in App. No. PCT/US2022/025851, mailing date Jul. 26, 2022, 12 pages.
International Search Report and Written Opinion issued in App. No. PCT/US2022/025852, mailing date Jul. 19, 2022, 11 pages.
International Search Report and Written Opinion issued in App. No. PCT/US2022/025853, mailing date Jul. 11, 2022, 10 pages.
Google translation of EP 1739122 (2007, 15 pages).
Google translation of JP 07258477 (1995, 8 pages).
Machine translation of EP-1739122-A1 (2007, 15 pages).
Soares (Analysis and Control of the Molecular Weight and Chemical Composition Distributions of Polyolefins Made with Metallocene and Ziegler-Natta Catalysts, Ing. Eng. Chem. Res., 1997, 36, pp. 1144-1150).
EP1739122B1 Machine Translation (Year: 2007) (pp. 1-16).
JP-07258477-A Machine Translation (Year: 1995) (pp. 1-13).

* cited by examiner

*Primary Examiner* — Brieann R Johnston
(74) *Attorney, Agent, or Firm* — Robert M. Lanning

(57) ABSTRACT

A polymer composition comprises a polyethylene polymer having a Melt Relaxation Index of 2 or greater and a salt of a branched alkyl phosphonic acid. A polyethylene film having improved barrier to water vapor and oxygen comprises a high-density polyethylene polymer having a density of about 930 $kg/m^3$ to about 980 $kg/m^3$ and a Melt Relaxation Index of 2 or greater and a salt of a branched alkyl phosphonic acid.

18 Claims, No Drawings

POLYETHYLENE POLYMER COMPOSITIONS AND ARTICLES MADE FROM THE SAME

CROSS-REFERENCE TO RELATED PATENT APPLICATIONS

This application claims, pursuant to 35 U.S.C. § 119(e), priority to and the benefit of the filing date of U.S. Patent Application No. 63/178,217, which was filed on Apr. 22, 2021, the contents of which are hereby incorporated by reference.

TECHNICAL FIELD OF THE INVENTION

This application relates to polymer compositions, such as polyethylene polymer compositions, containing a salt of a branched alkyl phosphonic acid and articles (e.g., blown films) made from such polymer compositions. The salt of a branched alkyl phosphonic acid is believed to serve as a nucleating agent for the polymer.

BACKGROUND

Several nucleating agents for thermoplastic polymers are known in the art. These nucleating agents generally function by forming nuclei or providing sites for the formation and/or growth of crystals in the thermoplastic polymer as it solidifies from a molten state. The nuclei or sites provided by the nucleating agent can allow the crystals to form within the cooling polymer at a higher temperature and/or at a more rapid rate than the crystals will form in the virgin, non-nucleated thermoplastic polymer. When present, such effects can then permit processing of a nucleated thermoplastic polymer composition at cycle times that are shorter than the virgin, non-nucleated thermoplastic polymer. Alternatively, the controlled nucleation induced by the nucleating agent can produce a polymer having a different crystalline structure than would result from purely self-nucleated crystallization of the polymer (i.e., polymer crystallization that occurs in the absence of any heterogeneous nucleating agent). These differences in crystalline structure can result in polymers having different physical properties that may be more desirable for certain applications.

While polymer nucleating agents may function in a similar manner, not all nucleating agents are created equal. For example, while nucleating agents for polyethylene polymers are known in the art, relatively few of these nucleating agents have been shown to improve the physical properties of the polyethylene polymer to any commercially significant degree. In particular, few nucleating agents can improve the barrier properties (e.g., decrease the water vapor and/or oxygen transmission rates) of articles made from polyethylene polymers.

Polyethylene films have established a major position in the food packaging industry due to their excellent shelf life, product protection, product display, and low cost. The characteristic of the packaged food product determines the optimal barrier performance of the packaging materials. Optimal barrier for some food products requires high barrier materials, while others need low barrier materials. For instance, dry foods, such as cereals, crackers, cookies, and powdered products, require packaging materials having high barrier to water vapor or moisture, while poultry products require the packaging materials have high barrier to oxygen. Thus, identifying an additive that can be used to improve the barrier properties of polyethylene-based films would allow producers to manufacture a range of polyethylene films satisfying the barrier requirements posed by a range of packaged goods. Such an additive would be even more desirable if it allowed the producer to manufacture films having desirable optical properties, such as low haze, high clarity, and/or high gloss.

Further, for high barrier applications, polyethylene films often incorporate a barrier layer of a different material (such as ethylene vinyl alcohol copolymers or polyamides). These barrier layers add complexity to manufacturing operations, increase film cost and expense, and impair recyclability of the film. Thus, improving polyethylene barrier would enable "monomaterial" packaging that delivers satisfactory barrier levels without incorporating these different barrier layers.

In view of the foregoing, a need remains for additives (e.g., nucleating agents) that are capable of producing polyethylene polymer compositions exhibiting a more desirable combination of physical properties, such as high barrier to water vapor and/or oxygen, low haze, high clarity, and/or high gloss. The additives and polymer compositions described herein are intended to address such need.

BRIEF SUMMARY OF THE INVENTION

In a first embodiment, the invention provides a polymer composition comprising: (a) a polyethylene polymer composition having a Melt Relaxation Index of 2 or greater; and (b) a salt of a branched alkyl phosphonic acid.

In a second embodiment, the invention provides a polyethylene film having improved barrier to water vapor and oxygen. The film comprises (i) a high-density polyethylene polymer composition having a density of about 930 $kg/m^3$ to about 980 $kg/m^3$ and a Melt Relaxation Index of 2 or greater and (ii) a salt of a branched alkyl phosphonic acid.

In a third embodiment, the invention provides a method for producing a film from a thermoplastic polymer composition. The method comprises the steps of:

(a) providing an apparatus comprising:
  (i) a die having an annular die orifice adapted to extrude a tube;
  (ii) a means for blowing pressurized fluid into the tube exiting the annular die orifice; and
  (iii) a means for drawing and collecting the tube;
(b) providing a polymer composition comprising (i) a polyethylene polymer composition having a Melt Relaxation Index of 2 or greater; and (ii) a salt of a branched alkyl phosphonic acid;
(c) heating the polymer composition to a temperature sufficient to melt the polymer composition so that it may be extruded through the die;
(d) extruding the molten polymer composition through the annular die orifice to form a tube exiting the annular die orifice in a first direction, the tube having a diameter and a length;
(e) blowing a pressurized fluid into the tube under sufficient pressure to inflate the tube and increase its diameter while simultaneously drawing the tube in the first direction to increase its length, thereby producing a film;
(f) allowing the film to cool to a temperature at which the polymer composition solidifies; and
(g) collecting the film.

DETAILED DESCRIPTION OF THE INVENTION

In a first embodiment, the invention provides a polymer composition comprising: (a) a polyethylene polymer composition; and (b) a salt of a branched alkyl phosphonic acid. The polyethylene polymer composition preferably has a Melt Relaxation Index of 2 or greater.

As noted above, the polymer composition comprises a polyethylene polymer. The polymer composition can comprise one polyethylene polymer or a mixture of two or more different polyethylene polymers, and the term "polyethylene polymer composition" will be used herein to broadly refer to a composition containing one polyethylene polymer or a mixture of two or more different polyethylene polymers. Suitable polyethylene polymers include, but are not limited to, low-density polyethylene, linear low-density polyethylene, medium-density polyethylene, high-density polyethylene, and combinations thereof. In certain preferred embodiments, the thermoplastic polymer is selected from the group consisting of linear low-density polyethylene, high-density polyethylene, and mixtures thereof. In another preferred embodiment, the thermoplastic polymer is a high-density polyethylene.

The high-density polyethylene polymers suitable for use in the invention generally have a density of greater than about 930 kg/$m^3$ (e.g., greater than 940 kg/$m^3$, about 941 kg/$m^3$ or more, about 950 kg/$m^3$ or more, or about 955 kg/$m^3$ or more). There is no upper limit to the suitable density of the polymer, but high-density polyethylene polymers typically have a density that is less than about 980 kg/$m^3$ (e.g., less than about 975 kg/$m^3$ or less than about 970 kg/$m^3$). Thus, in a preferred embodiment, the high-density polyethylene polymer has a density of about 930 kg/$m^3$ to about 980 kg/$m^3$ (e.g., about 940 kg/$m^3$ to about 980 kg/$m^3$, about 941 kg/$m^3$ to about 980 kg/$m^3$, about 950 kg/$m^3$ to about 980 kg/$m^3$, or about 955 kg/$m^3$ to about 980 kg/$m^3$), about 930 kg/$m^3$ to about 975 kg/$m^3$ (e.g., about 940 kg/$m^3$ to about 975 kg/$m^3$, about 941 kg/$m^3$ to about 975 kg/$m^3$, about 950 kg/$m^3$ to about 975 kg/$m^3$, or about 955 kg/$m^3$ to about 975 kg/$m^3$), or about 930 to about 970 kg/$m^3$ (e.g., about 940 kg/$m^3$ to about 970 kg/$m^3$, about 941 kg/$m^3$ to about 970 kg/$m^3$, about 950 kg/$m^3$ to about 970 kg/$m^3$, or about 955 kg/$m^3$ to about 970 kg/$m^3$).

The high-density polyethylene polymers suitable for use in the invention can be either homopolymers or copolymers of ethylene with one or more α-olefins. Suitable α-olefins include, but are not limited to, 1-butene, 1-hexene, 1-octene, 1-decene, and 4-methyl-1-pentene. The comonomer can be present in the copolymer in any suitable amount, such as an amount of about 5% by weight or less (e.g., about 3 mol. % or less). As will be understood by those of ordinary skill in the art, the amount of comonomer suitable for the copolymer is largely driven by the end use for the copolymer and the required or desired polymer properties dictated by that end use.

The high-density polyethylene polymers suitable for use in the invention can be produced by any suitable process. For example, the polymers can be produced by a free radical process using very high pressures as described, for example, in U.S. Pat. No. 2,816,883 (Larchar et al.), but the polymers typically are produced in a "low pressure" catalytic process. In this context, the term "low pressure" is used to denote processes carried out at pressures less than 6.9 MPa (e.g., 1,000 psig), such as 1.4-6.9 MPa (200-1,000 psig). Examples of suitable low pressure catalytic processes include, but are not limited to, solution polymerization processes (i.e., processes in which the polymerization is performed using a solvent for the polymer), slurry polymerization processes (i.e., processes in which the polymerization is performed using a hydrocarbon liquid in which the polymer does not dissolve or swell), gas-phase polymerization processes (e.g., processes in which the polymerization is performed without the use of a liquid medium or diluent), or a staged reactor polymerization process. The suitable gas-phase polymerization processes also include the so-called "condensed mode" or "super-condensed mode" processes in which a liquid hydrocarbon is introduced into the fluidized-bed to increase the absorption of the heat producing during the polymerization process. In these condensed mode and super-condensed mode processes, the liquid hydrocarbon typically is condensed in the recycle stream and reused in the reactor. The staged reactor processes can utilize a combination of slurry process reactors (tanks or loops) that are connected in series, parallel, or a combination of series or parallel so that the catalyst (e.g., chromium catalyst) is exposed to more than one set of reaction conditions. Staged reactor processes can also be carried out by combining two loops in series, combining one or more tanks and loops in series, using multiple gas-phase reactors in series, or a loop-gas phase arrangement. Because of their ability to expose the catalyst to different sets of reactor conditions, staged reactor processes are often used to produce multimodal polymers, such as those discussed below. Suitable processes also include those in which a pre-polymerization step is performed. In this pre-polymerization step, the catalyst typically is exposed to the cocatalyst and ethylene under mild conditions in a smaller, separate reactor, and the polymerization reaction is allowed to proceed until the catalyst comprises a relatively small amount (e.g., about 5% to about 30% of the total weight) of the resulting composition. This pre-polymerized catalyst is then introduced to the large-scale reactor in which the polymerization is to be performed.

The high-density polyethylene polymers suitable for use in the invention can be produced using any suitable catalyst or combination of catalysts. Suitable catalysts include transition metal catalysts, such as supported reduced molybdenum oxide, cobalt molybdate on alumina, chromium oxide, and transition metal halides. Chromium oxide catalysts typically are produced by impregnating a chromium compound onto a porous, high surface area oxide carrier, such as silica, and then calcining it in dry air at 500-900° C. This converts the chromium into a hexavalent surface chromate ester or dichromate ester. The chromium oxide catalysts can be used in conjunction with metal alkyl cocatalysts, such as alkyl boron, alkyl aluminum, alkyl zinc, and alkyl lithium. Supports for the chromium oxide include silica, silica-titania, silica-alumina, alumina, and aluminophosphates. Further examples of chromium oxide catalysts include those catalysts produced by depositing a lower valent organochromium compound, such as bis(arene) $Cr^0$, allyl $Cr^{2+}$ and $Cr^{3+}$, beta stabilized alkyls of $Cr^{2+}$ and $Cr^{4+}$, and bis(cyclopentadienyl) $Cr^{2+}$, onto a chromium oxide catalyst, such as those described above. Suitable transition metal catalysts also include supported chromium catalysts such as those based on chromocene or a silylchromate (e.g., bi(trisphenylsilyl) chromate). These chromium catalysts can be supported on any suitable high surface area support such as those described above for the chromium oxide catalysts, with silica typically being used. The supported chromium catalysts can also be used in conjunction with cocatalysts, such as the metal alkyl cocatalysts listed above for the chromium oxide catalysts. Suitable transition metal halide catalysts include titanium (III) halides (e.g., titanium (III) chloride), titanium (IV) halides (e.g., titanium (IV) chloride), vanadium halides, zirconium halides, and combinations thereof. These transition metal halides are often supported on a high surface area solid, such as magnesium chloride. The transition metal halide catalysts are typically used in conjunction with an aluminum alkyl cocatalyst, such as trimethylaluminum (i.e., $Al(CH_3)_3$) or triethylaluminum (i.e., $Al(C_2H_5)_3$). These transition metal halides may also be used in staged reactor processes. Suitable catalysts also include metallocene catalysts, such as cyclopentadienyl titanium halides (e.g., cyclopentadienyl titanium chlorides), cyclopentadienyl zirconium halides (e.g., cyclopentadienyl zirconium chlorides), cyclopentadienyl hafnium halides (e.g., cyclopentadienyl hafnium chlorides), and combinations thereof. Metallocene catalysts based on transition metals complexed with indenyl or fluorenyl ligands are also known and can be used to produce high-density polyethylene polymers suitable for use in the invention. The catalysts typically contain multiple ligands, and the ligands can be substituted with various groups (e.g., n-butyl group) or linked with bridging groups, such as $—CH_2CH_2—$ or $>SiPh_2$. The metallocene catalysts typically are used in conjunction with a cocatalyst, such as methyl aluminoxane (i.e., $(Al(CH_3)_xO_y)_n$. Other cocatalysts include those described in U.S. Pat. No. 5,919,983 (Rosen et al.), U.S. Pat. No. 6,107,230 (McDaniel et al.), U.S. Pat. No. 6,632,894 (McDaniel et al.), and U.S. Pat. No. 6,300,271 (McDaniel et al). Other "single site" catalysts suitable for use in producing high-density polyethylene include diimine complexes, such as those described in U.S. Pat. No. 5,891,963 (Brookhart et al.).

The high-density polyethylene polymers suitable for use in the invention can have any suitable molecular weight (e.g., weight average molecular weight). For example, the weight average molecular weight of the high-density polyethylene can be from 20,000 g/mol to about 1,000,000 g/mol or more. As will be understood by those of ordinary skill in the art, the suitable weight average molecular weight of the high-density polyethylene will depend, at least in part, on the particular application or end use for which the polymer is destined. For example, a high-density polyethylene polymer intended for blow molding applications can have a weight average molecular weight of about 100,000 g/mol to about 1,000,000 g/mol. A high-density polyethylene polymer intended for pipe applications or film applications can have a weight average molecular weight of about 100,000 g/mol to about 500,000 g/mol. A high-density polyethylene polymer intended for injection molding applications can have a weight average molecular weight of about 20,000 g/mol to about 80,000 g/mol. A high-density polyethylene polymer intended for wire insulation applications, cable insulation applications, tape applications, or filament applications can have a weight average molecular weight of about 80,000 g/mol to about 400,000 g/mol. A high-density polyethylene polymer intended for rotomolding applications can have a weight average molecular weight of about 50,000 g/mol to about 150,000 g/mol.

The high-density polyethylene polymers suitable for use in the invention can also have any suitable polydispersity, which is defined as the value obtained by dividing the weight average molecular weight of the polymer by the number average molecular weight of the polymer. For example, the high-density polyethylene polymer can have a polydispersity of greater than 2 to about 100. As understood by those skilled in the art, the polydispersity of the polymer is heavily influenced by the catalyst system used to produce the polymer, with the metallocene and other "single site" catalysts generally producing polymers with relatively low polydispersity and narrow molecular weight distributions and the other transition metal catalysts (e.g., chromium catalysts) producing polymers with higher polydispersity and broader molecular weight distributions. The high-density polyethylene polymers suitable for use in the invention can also have a multimodal (e.g., bimodal) molecular weight distribution. For example, the polymer can have a first fraction having a relatively low molecular weight and a second fraction having a relatively high molecular weight. The difference between the weight average molecular weight of the fractions in the polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term "distinct" does not necessarily mean that the portions of the GPC curve corresponding to each fraction do not overlap, but is merely meant to indicate that a distinct peak (i.e., a local maximum) for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight.

The molecular weight distribution of the polymer can also be characterized by measuring and comparing the melt flow index (or melt flow rate) of the polymer under different conditions to yield a flow rate ratio (FRR). This method is described, for example, in Procedure D of ASTM Standard D1238 entitled "Standard Test Method for Melt Flow Rates of Thermoplastics by Extrusion Plastometer." Preferably, the FRR is calculated using the melt flow index measured using the 21.6 kg load specified in the standard (MF121.6) and the melt flow index measured using the 2.16 kg load specified in the standard (MF12.16), with both melt flow indices being measured at 190° C. temperature specified in the standard. The high-density polyethylene polymer used in the polymer composition can have any suitable FRR. Preferably, the high-density polyethylene polymer has a FRR (MF121.6/MF12.16) of about 65 or less. More preferably, the high-density polyethylene polymer has a FRR (MF121.6/MF12.16) of about 40 or less or about 20 or less.

The high-density polyethylene polymers suitable for use in the invention can have any suitable melt flow index. For example, the high-density polyethylene polymer can have a melt flow index of about 0.01 dg/min to about 50 dg/min (e.g., about 0.01 dg/min to about 40 dg/min). As with the weight average molecular weight, those of ordinary skill in the art understand that the suitable melt flow index for the high-density polyethylene polymer will depend, at least in part, on the particular application or end use for which the polymer is destined. Thus, for example, a high-density polyethylene polymer intended for blow molding applications can have a melt flow index of about 0.01 dg/min to about 1 dg/min. A high-density polyethylene polymer intended for blown film applications can have a melt flow index of about 0.5 dg/min to about 50 dg/min (e.g., about 1 dg/min to about 10 dg/min, about 1 dg/min to about 5 dg/min, or about 0.5 dg/min to about 3 dg/min). A high-density polyethylene polymer intended for cast film applications can have a melt flow index of about 2 dg/min to about 10 dg/min. A high-density polyethylene polymer intended for pipe applications can have a melt flow index of about 2 dg/min to about 40 dg/min (measured with the 21.6 kg load at 190° C.). A high-density polyethylene polymer intended for injection molding applications can have a melt flow index of about 2 dg/min to about 80 dg/min. A high-density polyethylene polymer intended for rotomolding applications can have a melt flow index of about 0.5 dg/min to about 10 dg/min. A high-density polyethylene polymer intended for tape applications can have a melt flow index of about 0.2 dg/min to about 4 dg/min. A high-density polyethylene polymer intended for filament applications can have a melt flow index of about 1 dg/min to about 20 dg/min. The melt flow index of the polymer is measured using ASTM Standard D1238-04c.

The high-density polyethylene polymers suitable for use in the invention generally do not contain high amounts of long-chain branching. The term "long-chain branching" is used to refer to branches that are attached to the polymer chain and are of sufficient length to affect the rheology of the polymer (e.g., branches of about 130 carbons or more in length). If desired for the application in which the polymer is to be used, the high-density polyethylene polymer can contain small amounts of long-chain branching. However, the high-density polyethylene polymers suitable for use in the invention typically contain very little long-chain branching (e.g., less than about 1 long-chain branch per 10,000 carbons, less than about 0.5 long-chain branches per 10,000 carbons, less than about 0.1 long-chain branches per 10,000 carbons, or less than about 0.01 long-chain branches per 10,000 carbons).

The degree of long chain branching in the polymer can also be characterized using rheological methods (see, e.g., R. N. Shroff and H. Mavridis, "Long-Chain-Branching Index for Essentially Linear Polyethylenes," *Macromolecules*, Vol. 32 (25), pp. 8454-8464 (1999)). In particular, the long chain branch index (LCBI) is a rheological index used to characterize relatively low levels of long-chain branching and is defined as follows:

$$LCBI = \frac{\eta_0^{0.179}}{4.8 \cdot [\eta]} - 1$$

where no is the limiting, zero-shear viscosity (expressed in Poise) at 190° C., and [η] is the intrinsic viscosity (expressed in dL/g) in trichlorobenzene at 135° C. The LCBI is based on observations that low levels of long-chain branching, in an otherwise linear polymer, result in a large increase in melt viscosity, no, with no change in intrinsic viscosity, [η]. A higher LCBI means a greater number of long-chain branches per polymer chain. Preferably, the high-density polyethylene polymer used in the polymer composition has an LCBI of about 0.5 or less, about 0.3 or less, or about 0.2 or less.

In one preferred embodiment, the polymer composition comprises a blend of two or more high-density polyethylene polymer compositions. In one preferred embodiment comprising two high-density polyethylene polymer compositions, the first high-density polyethylene polymer composition has a density of about 950 kg/$m^3$ to about 975 kg/$m^3$ (preferably 950 kg/mina to 960 kg/$min^3$), and the second high-density polyethylene polymer composition has a density of about 950 kg/$m^3$ to about 970 kg/$m^3$ (preferably 955 kg/$m^3$ to 965 kg/$m^3$). The melt flow index of the first high-density polyethylene polymer composition (as determined in accordance with ASTM D 1238 at 190° C. using a 2.16 kg load) preferably is greater than 5 dg/min (more preferably from about 15 dg/min to about 30 dg/min). Furthermore, the melt flow index of the first high-density polyethylene polymer composition preferably is at least ten times greater than the melt flow index of the second high-density polyethylene polymer composition. The melt flow index of the second high-density polyethylene polymer composition (as determined in accordance with ASTM D 1238 at 190° C. using a 2.16 kg load) preferably is about 0.1 dg/min to about 2 dg/min (more preferably about 0.8 dg/min to about 2 dg/min). The first high-density polyethylene polymer composition can have any suitable polydispersity, but the polydispersity (as determined by gel permeation chromatography in accordance with ASTM D 6474-99) preferably is from about 2 to about 20, more preferably about 2 to about 4. While not wishing to be bound by theory, it is believed that a low polydispersity (e.g., from 2 to 4) for the first high-density polyethylene polymer composition may improve the nucleation rate and overall barrier performance of blown films prepared from the polymer composition. The polydispersity of the second high-density polyethylene polymer composition is not believed to be critical to achieving desirable results, but a polydispersity of from about 2 to about 4 is preferred for the second high-density polyethylene polymer. The first high-density polyethylene polymer composition described above can consist of a single high-density polyethylene polymer that provides the desired characteristics, or the first high-density polyethylene polymer composition can comprise a blend of two or more high-density polyethylene polymers that possesses the desired characteristics. Likewise, the second high-density polyethylene polymer composition can consist of a single high-density polyethylene polymer or a blend of two or more high-density polyethylene polymers that possesses the desired characteristics.

In the embodiment described in the preceding paragraph, the first and second high-density polyethylene polymer compositions can be present in the polymer composition in any suitable relative amounts. Preferably, the first high-density polyethylene polymer composition is present in an amount of from about 5 wt. % to about 60 wt. % of the total high-density polyethylene polymer present in the composition (with the second high-density polyethylene polymer composition forming the balance). In other preferred embodiments, the first high-density polyethylene polymer composition is present in an amount of from about 10 wt. % to about 40 wt. % or about 20 wt. % to about 40 wt. %. In one particularly preferred embodiment, the polymer composition comprises (i) about 10 wt. % to about 30 wt. % of a first high-density polyethylene polymer composition having a melt flow index of about 15 to about 30 dg/min and a density of about 950 kg/$m^3$ to about 960 kg/$m^3$ and (ii) about 70 wt. % to about 90 wt. % of a second high-density polyethylene polymer composition having a melt flow index of about 0.8 to about 2 dg/min and a density of about 955 kg/$m^3$ to about 965 kg/$m^3$. The blends of high-density polyethylene polymers described above can be made by any suitable process, such as (i) physical blending of particulate resins; (ii) co-feeding of different high-density polyethylene resins to a common extruder; (iii) melt mixing (in any conventional polymer mixing apparatus); (iv) solution blending; or (v) a polymerization process which employs two or more reactors. A highly preferred blend of high-density polyethylene polymer compositions is prepared by a solution polymerization process using two reactors that operate under different polymerization conditions. This provides a uniform, in situ blend of the first and second high-density polyethylene polymer compositions. An example of this process is described in published U.S. Patent Application Publication No. 2006/0047078 A1 (Swabey et al.), the disclosure of which is incorporated herein by reference. The overall blend of the high-density polyethylene polymer compositions preferably has a polydispersity of from about 3 to about 20.

The medium-density polyethylene polymers suitable for use in the invention generally have a density of about 926 kg/$m^3$ to about 940 kg/$m^3$. The term "medium-density polyethylene" is used to refer to polymers of ethylene that have a density between that of high-density polyethylene and linear low-density polyethylene and contain relatively short branches, at least as compared to the long branches present in low-density polyethylene polymers produced by the free radical polymerization of ethylene at high pressures.

The medium-density polyethylene polymers suitable for use in the invention generally are copolymers of ethylene and at least one α-olefin, such as 1-butene, 1-hexene, 1-octene, 1-decene, and 4-methyl-1-pentene. The α-olefin comonomer can be present in any suitable amount, but typically is present in an amount of less than about 8% by weight (e.g., less than about 5 mol %). As will be understood by those of ordinary skill in the art, the amount of comonomer suitable for the copolymer is largely driven by the end use for the copolymer and the required or desired polymer properties dictated by that end use.

The medium-density polyethylene polymers suitable for use in the invention can be produced by any suitable process. Like the high-density polyethylene polymers, the medium-density polyethylene polymers typically are produced in "low pressure" catalytic processes such as any of the processes described above in connection with the high-density polyethylene polymers suitable for use in the invention. Examples of suitable processes include, but are not limited to, gas-phase polymerization processes, solution polymerization processes, slurry polymerization processes, and staged reactor processes. Suitable staged reactor processes can incorporate any suitable combination of the gas-phase, solution, and slurry polymerization processes described above. As with high-density polyethylene polymers, staged reactor processes are often used to produce multimodal polymers.

The medium-density polyethylene polymers suitable for use in the invention can be produced using any suitable catalyst or combination of catalysts. For example, the polymers can be produced using Ziegler catalysts, such as transition metal (e.g., titanium) halides or esters used in combination with organoaluminum compounds (e.g., triethylaluminum). These Ziegler catalysts can be supported on, for example, magnesium chloride, silica, alumina, or magnesium oxide. The medium-density polyethylene polymers suitable for use in the invention can also be produced using so-called "dual Ziegler catalysts," which contain one catalyst species for dimerizing ethylene into 1-butene (e.g., a combination of a titanium ester and triethylaluminum) and another catalyst for copolymerization of ethylene and the generated 1-butene (e.g., titanium chloride supported on magnesium chloride). The medium-density polyethylene polymers suitable for use in the invention can also be produced using chromium oxide catalysts, such as those produced by depositing a chromium compound onto a silica-titania support, oxidizing the resulting catalyst in a mixture of oxygen and air, and then reducing the catalyst with carbon monoxide. These chromium oxide catalysts typically are used in conjunction with cocatalysts such as trialkylboron or trialkylaluminum compounds. The chromium oxide catalysts can also be used in conjunction with a Ziegler catalyst, such as a titanium halide- or titanium ester-based catalyst. The medium-density polyethylene polymers suitable for use in the invention can also be produced using supported chromium catalysts such as those described above in the discussion of catalysts suitable for making high-density polyethylene. The medium-density polyethylene polymers suitable for use in the invention can also be produced using metallocene catalysts. Several different types of metallocene catalysts can be used. For example, the metallocene catalyst can contain a bis(metallocene) complex of zirconium, titanium, or hafnium with two cyclopentadienyl rings and methylaluminoxane. As with the catalysts used in high-density polyethylene production, the ligands can be substituted with various groups (e.g., n-butyl group) or linked with bridging groups. Another class of metallocene catalysts that can be used are composed of bis(metallocene) complexes of zirconium or titanium and anions of perfluorinated boronaromatic compounds. A third class of metallocene catalysts that can be used are referred to as constrained-geometry catalysts and contain monocyclopentadienyl derivatives of titanium or zirconium in which one of the carbon atoms in the cyclopentadienyl ring is linked to the metal atom by a bridging group. These complexes are activated by reacting them with methylaluminoxane or by forming ionic complexes with non-coordinative anions, such as $B(C_6F_5)_4^-$ or $B(C_6F_5)_3CH_3^-$. A fourth class of metallocene catalysts that can be used are metallocene-based complexes of a transition metal, such as titanium, containing one cyclopentadienyl ligand in combination with another ligand, such as a phosphinimine or —O—$SiR_3$. This class of metallocene catalyst is also activated with methylaluminoxane or a boron compound. Other catalysts suitable for use in making the medium-density polyethylene suitable for use in the invention include, but are not limited to, the catalysts disclosed in U.S. Pat. No. 6,649,558.

The medium-density polyethylene polymers suitable for use in the invention can have any suitable compositional uniformity, which is a term used to describe the uniformity of the branching in the copolymer molecules of the polymer. Many commercially-available medium-density polyethylene polymers have a relatively low compositional uniformity in which the high molecular weight fraction of the polymer contains relatively little of the α-olefin comonomer and has relatively little branching while the low molecular weight fraction of the polymer contains a relatively high amount of the α-olefin comonomer and has a relatively large amount of branching. Alternatively, another set of medium-density polyethylene polymers have a relatively low compositional uniformity in which the high molecular weight fraction of the polymer contains a relatively high amount of the α-olefin comonomer while the low molecular weight fraction of the polymer contains relatively little of the α-olefin comonomer. The compositional uniformity of the polymer can be measured using any suitable method, such as temperature rising elution fractionation.

The medium-density polyethylene polymers suitable for use in the invention can have any suitable molecular weight. For example, the polymer can have a weight average molecular weight of about 50,000 g/mol to about 200,000 g/mol. As will be understood by those of ordinary skill in the art, the suitable weight average molecular weight of the medium-density polyethylene will depend, at least in part, on the particular application or end use for which the polymer is destined.

The medium-density polyethylene polymers suitable for use in the invention can also have any suitable polydispersity. Many commercially available medium-density polyethylene polymers have a polydispersity of about 2 to about 30. The medium-density polyethylene polymers suitable for use in the invention can also have a multimodal (e.g., bimodal) molecular weight distribution. For example, the polymer can have a first fraction having a relatively low molecular weight and a second fraction having a relatively high molecular weight. As with the high-density polyethylene polymers suitable for use in the invention, the difference between the weight average molecular weight of the fractions in the multimodal medium-density polyethylene polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term “distinct” does not necessarily mean that the portions of the GPC curve corresponding to each fraction do not overlap, but is merely meant to indicate that a distinct peak for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight The medium-density polyethylene polymers suitable for use in the invention can have any suitable melt flow index. For example, the medium-density polyethylene polymer can have a melt flow index of about 0.01 dg/min to about 200 dg/min. As with the weight average molecular weight, those of ordinary skill in the art understand that the suitable melt flow index for the medium-density polyethylene polymer will depend, at least in part, on the particular application or end use for which the polymer is destined. Thus, for example, a medium-density polyethylene polymer intended for blow molding applications or pipe applications can have a melt flow index of about 0.01 dg/min to about 1 dg/min. A medium-density polyethylene polymer intended for blown film applications can have a melt flow index of about 0.5 dg/min to about 3 dg/min. A medium-density polyethylene polymer intended for cast film applications can have a melt flow index of about 2 dg/min to about 10 dg/min. A medium-density polyethylene polymer intended for injection molding applications can have a melt flow index of about 6 dg/min to about 200 dg/min. A medium-density polyethylene polymer intended for rotomolding applications can have a melt flow index of about 4 dg/min to about 7 dg/min. A medium-density polyethylene polymer intended for wire and cable insulation applications can have a melt flow index of about 0.5 dg/min to about 3 dg/min. The melt flow index of the polymer is measured using ASTM Standard D1238-04c.

The medium-density polyethylene polymers suitable for use in the invention generally do not contain a significant amount of long-chain branching. For example, the medium-density polyethylene polymers suitable for use in the invention generally contain less than about 0.1 long-chain branches per 10,000 carbon atoms (e.g., less than about 0.002 long-chain branches per 100 ethylene units) or less than about 0.01 long-chain branches per 10,000 carbon atoms.

The linear low-density polyethylene polymers suitable for use in the invention generally have a density of 925 kg/m$^3$ or less (e.g., about 910 kg/m$^3$ to about 925 kg/m$^3$). The term “linear low-density polyethylene” is used to refer to lower density polymers of ethylene having relatively short branches, at least as compared to the long branches present in low-density polyethylene polymers produced by the free radical polymerization of ethylene at high pressures.

The linear low-density polyethylene polymers suitable for use in the invention generally are copolymers of ethylene and at least one α-olefin, such as 1-butene, 1-hexene, 1-octene, 1-decene, and 4-methyl-1-pentene. The α-olefin comonomer can be present in any suitable amount, but typically is present in an amount of less than about 6 mol. % (e.g., about 2 mol % to about 5 mol %). As will be understood by those of ordinary skill in the art, the amount of comonomer suitable for the copolymer is largely driven by the end use for the copolymer and the required or desired polymer properties dictated by that end use.

The linear low-density polyethylene polymers suitable for use in the invention can be produced by any suitable process. Like the high-density polyethylene polymers, the linear low-density polyethylene polymers typically are produced in “low pressure” catalytic processes such as any of the processes described above in connection with the high-density polyethylene polymers suitable for use in the invention. Suitable processes include, but are not limited to, gas-phase polymerization processes, solution polymerization processes, slurry polymerization processes, and staged reactor processes. Suitable staged reactor processes can incorporate any suitable combination of the gas-phase, solution, and slurry polymerization processes described above. As with high-density polyethylene polymers, staged reactor processes are often used to produce multimodal polymers.

The linear low-density polyethylene polymers suitable for use in the invention can be produced using any suitable catalyst or combination of catalysts. For example, the polymers can be produced using Ziegler catalysts, such as transition metal (e.g., titanium) halides or esters used in combination with organoaluminum compounds (e.g., triethylaluminum). These Ziegler catalysts can be supported on, for example, magnesium chloride, silica, alumina, or magnesium oxide. The linear low-density polyethylene polymers suitable for use in the invention can also be produced using so-called “dual Ziegler catalysts,” which contain one catalyst species for dimerizing ethylene into 1-butene (e.g., a combination of a titanium ester and triethylaluminum) and another catalyst for copolymerization of ethylene and the generated 1-butene (e.g., titanium chloride supported on magnesium chloride). The linear low-density polyethylene polymers suitable for use in the invention can also be produced using chromium oxide catalysts, such as those produced by depositing a chromium compound onto a silica-titania support, oxidizing the resulting catalyst in a mixture of oxygen and air, and then reducing the catalyst with carbon monoxide. These chromium oxide catalysts typically are used in conjunction with cocatalysts such as trialkylboron or trialkylaluminum compounds. The chromium oxide catalysts can also be used in conjunction with a Ziegler catalyst, such as a titanium halide- or titanium ester-based catalyst. The linear low-density polyethylene polymers suitable for use in the invention can also be produced using supported chromium catalysts such as those described above in the discussion of catalysts suitable for making high-density polyethylene. The linear low-density polyethylene suitable for use in the invention can also be produced using metallocene catalysts. Several different types of metallocene catalysts can be used. For example, the metallocene catalyst can contain a bis(metallocene) complex of zirconium, titanium, or hafnium with two cyclopentadienyl rings and methylaluminoxane. As with the catalysts used in high-density polyethylene production, the ligands can be substituted with various groups (e.g., n-butyl group) or linked with bridging groups. Another class of metallocene catalysts that can be used are composed of bis(metallocene) complexes of zirconium or titanium and anions of perfluorinated boronaromatic compounds. A third class of metallocene catalysts that can be used are referred to as constrained-geometry catalysts and contain monocyclopentadienyl derivatives of titanium or zirconium in which one of the carbon atoms in the cyclopentadienyl ring is linked to the metal atom by a bridging group. These complexes are activated by reacting them with methylaluminoxane or by forming ionic complexes with non-coordinative anions, such as $B(C_6F_5)_4^-$ or $B(C_6F_5)_3CH_3^-$. A fourth class of metallocene catalysts that can be used are metallocene-based complexes of a transition metal, such as titanium, containing one cyclopentadienyl ligand in combination with another ligand, such as a phosphinimine or —O—Si $R_3$. This class of metallocene catalyst is also activated with methylaluminoxane or a boron compound. Other catalysts suitable for use in making the linear low-density polyethylene suitable for use in the invention include, but are not limited to, the catalysts disclosed in U.S. Pat. No. 6,649,558.

The linear low-density polyethylene polymers suitable for use in the invention can have any suitable compositional uniformity, which is a term used to describe the uniformity of the branching in the copolymer molecules of the polymer. Many commercially-available linear low-density polyethylene polymers have a relatively low compositional uniformity in which the high molecular weight fraction of the polymer contains relatively little of the α-olefin comonomer and has relatively little branching while the low molecular weight fraction of the polymer contains a relatively high amount of the α-olefin comonomer and has a relatively large amount of branching. Alternatively, another set of linear low-density polyethylene polymers have a relatively low compositional uniformity in which the high molecular weight fraction of the polymer contains a relatively high amount of the α-olefin comonomer while the low molecular weight fraction of the polymer contains relatively little of the α-olefin comonomer. The compositional uniformity of the polymer can be measured using any suitable method, such as temperature rising elution fractionation.

The linear low-density polyethylene polymers suitable for use in the invention can have any suitable molecular weight. For example, the polymer can have a weight average molecular weight of about 20,000 g/mol to about 250,000 g/mol. As will be understood by those of ordinary skill in the art, the suitable weight average molecular weight of the linear low-density polyethylene will depend, at least in part, on the particular application or end use for which the polymer is destined.

The linear low-density polyethylene polymers suitable for use in the invention can also have any suitable polydispersity. Many commercially available linear low-density polyethylene polymers have a relatively narrow molecular weight distribution and thus a relatively low polydispersity, such as about 2 to about 5 (e.g., about 2.5 to about 4.5 or about 3.5 to about 4.5). The linear low-density polyethylene polymers suitable for use in the invention can also have a multimodal (e.g., bimodal) molecular weight distribution. For example, the polymer can have a first fraction having a relatively low molecular weight and a second fraction having a relatively high molecular weight. As with the high-density polyethylene polymers suitable for use in the invention, the difference between the weight average molecular weight of the fractions in the multimodal linear low-density polyethylene polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term "distinct" does not necessarily mean that the portions of the GPC curve corresponding to each fraction do not overlap, but is merely meant to indicate that a distinct peak for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight The linear low-density polyethylene polymers suitable for use in the invention can have any suitable melt flow index. For example, the linear low-density polyethylene polymer can have a melt flow index of about 0.01 dg/min to about 200 dg/min. As with the weight average molecular weight, those of ordinary skill in the art understand that the suitable melt flow index for the linear low-density polyethylene polymer will depend, at least in part, on the particular application or end use for which the polymer is destined. Thus, for example, a linear low-density polyethylene polymer intended for blow molding applications or pipe applications can have a melt flow index of about 0.01 dg/min to about 1 dg/min. A linear low-density polyethylene polymer intended for blown film applications can have a melt flow index of about 0.5 dg/min to about 3 dg/min. A linear low-density polyethylene polymer intended for cast film applications can have a melt flow index of about 2 dg/min to about 10 dg/min. A linear low-density polyethylene polymer intended for injection molding applications can have a melt flow index of about 6 dg/min to about 200 dg/min. A linear low-density polyethylene polymer intended for rotomolding applications can have a melt flow index of about 4 dg/min to about 7 dg/min. A linear low-density polyethylene polymer intended for wire and cable insulation applications can have a melt flow index of about 0.5 dg/min to about 3 dg/min. The melt flow index of the polymer is measured using ASTM Standard D1238-04c.

The linear low-density polyethylene polymers suitable for use in the invention generally do not contain a significant amount of long-chain branching. For example, the linear low-density polyethylene polymers suitable for use in the invention generally contain less than about 0.1 long-chain branches per 10,000 carbon atoms (e.g., less than about 0.002 long-chain branches per 100 ethylene units) or less than about 0.01 long-chain branches per 10,000 carbon atoms.

The low-density polyethylene polymers suitable for use in the invention generally have a density of less than 935 kg/$m^3$ and, in contrast to high-density polyethylene, medium-density polyethylene and linear low-density polyethylene, have a relatively large amount of long-chain branching in the polymer.

The low-density polyethylene polymers suitable for use in the invention can be either ethylene homopolymers or copolymers of ethylene and a polar comonomer. Suitable polar comonomers include, but are not limited to, vinyl acetate, methyl acrylate, ethyl acrylate, and acrylic acid. These comonomers can be present in any suitable amount, with comonomer contents as high as 20% by weight being used for certain applications. As will be understood by those skilled in the art, the amount of comonomer suitable for the polymer is largely driven by the end use for the polymer and the required or desired polymer properties dictated by that end use.

The low-density polyethylene polymers suitable for use in the invention can be produced using any suitable process, but typically the polymers are produced by the free-radical initiated polymerization of ethylene at high pressure (e.g., about 81 to about 276 MPa) and high temperature (e.g., about 130 to about 330° C.). Any suitable free radical initiator can be used in such processes, with peroxides and oxygen being the most common. The free-radical polymerization mechanism gives rise to short-chain branching in the polymer and also to the relatively high degree of long-chain branching that distinguishes low-density polyethylene from other ethylene polymers (e.g., high-density polyethylene and linear low-density polyethylene). The polymerization reaction typically is performed in an autoclave reactor (e.g., a stirred autoclave reactor), a tubular reactor, or a combination of such reactors positioned in series.

The low-density polyethylene polymers suitable for use in the invention can have any suitable molecular weight. For example, the polymer can have a weight average molecular weight of about 30,000 g/mol to about 500,000 g/mol. As will be understood by those of ordinary skill in the art, the suitable weight average molecular weight of the low-density polyethylene will depend, at least in part, on the particular application or end use for which the polymer is destined. For example, a low-density polyethylene polymer intended for blow molding applications can have a weight average molecular weight of about 80,000 g/mol to about 200,000 g/mol. A low-density polyethylene polymer intended for pipe applications can have a weight average molecular weight of about 80,000 g/mol to about 200,000 g/mol. A low-density polyethylene polymer intended for injection molding applications can have a weight average molecular weight of about 30,000 g/mol to about 80,000 g/mol. A low-density polyethylene polymer intended for film applications can have a weight average molecular weight of about 60,000 g/mol to about 500,000 g/mol.

The low-density polyethylene polymers suitable for use in the invention can have any suitable melt flow index. For example, the low-density polyethylene polymer can have a melt flow index of about 0.2 to about 100 dg/min. As noted above, the melt flow index of the polymer is measured using ASTM Standard D1238-04c.

As noted above, one of the major distinctions between low-density polyethylene and other ethylene polymers is a relatively high degree of long-chain branching within the polymer. The low-density polyethylene polymers suitable for use in the invention can exhibit any suitable amount of long-chain branching, such as about 0.01 or more long-chain branches per 10,000 carbon atoms, about 0.1 or more long-chain branches per 10,000 carbon atoms, about 0.5 or more long-chain branches per 10,000 carbon atoms, about 1 or more long-chain branches per 10,000 carbon atoms, or about 4 or more long-chain branches per 10,000 carbon atoms. While there is not a strict limit on the maximum extent of long-chain branching that can be present in the low-density polyethylene polymers suitable for use in the invention, the long-chain branching in many low-density polyethylene polymers is less than about 100 long-chain branches per 10,000 carbon atoms.

The polyethylene polymer composition utilized in the composition can comprise any suitable polyethylene polymer or mixture of polyethylene polymers. However, it is believed that polyethylene polymer compositions exhibiting greater degrees of melt relaxation will be more effectively nucleated by the salt of a branched alkyl phosphonic acid. During certain melt processing of a polymer (e.g., blown film manufacturing), the polymer melt is subjected to extensional thinning or strain as it is extruded through a die. The polymer melt may be subjected to further extensional thinning or strain as the extruded polymer melt is further processed, such as being drawn and/or blown. The strain applied to the polymer melt results in a flow direction orientation of extended polymer chains in the polymer melt. As the processed polymer melt cools, these directionally oriented, extended polymer chains can return to a less ordered state before crystallization of the polymer melt. This process is referred to herein as "melt relaxation." Alternatively, the directionally oriented, extended polymer chains can remain oriented in the melt and crystallize to form fibrils. These fibrils provide sites which can initiate self-nucleation of the polymer. If enough of such fibrils form in the polymer as it solidifies from the melt, the resulting strain-induced self-nucleation can become the dominant mode of nucleation in the polymer. While self-nucleation of the polymer may sound beneficial, the polymer structure produced by such self-nucleation is generally less favorable for certain desired physical properties. For example, self-nucleated polyethylene generally exhibits higher water vapor and oxygen transmission rates than polyethylene that has been heterogeneously nucleated with, for example, a salt of a branched alkyl phosphonic acid. Thus, in order to maximize the degree of nucleation induced by the salt of a branched alkyl phosphonic acid, the polymer composition preferably contains a polyethylene polymer composition that exhibits sufficient melt relaxation to ensure that strain-induced, self-nucleation will not dominate.

The degree of melt relaxation exhibited by a polymer cannot easily be directly quantified. Further, it is believed that melt relaxation can be influenced by a number of factors, such as molecular weight, breadth of the molecular weight distribution, the relative amount of the high molecular weight fraction in the molecular weight distribution, and branching or non-linear chains in the polymer. The number of factors involved and the complex relationship between those factors make it difficult to identify ranges of values for each that will be sufficient to define a polyethylene polymer that exhibits sufficient melt relaxation. In other words, one might try to define a molecular weight distribution for polymers that exhibit sufficient melt relaxation, but the appropriate range may change with the "shape" of the distribution (i.e., the relative amount of the high molecular weight fraction). Thus, while these factors can be considered when attempting to identify a polyethylene polymer that exhibits sufficient melt relaxation, a more direct and accurate gauge of melt relaxation may be desired.

The shear storage modulus (G) of a viscoelastic material (e.g., a polymer melt) is related to stored energy (stress), such as that stored in the directionally oriented, extended polymer chains described above. The shear loss modulus (G") of a viscoelastic material is related to energy loss or dissipation, such as that released by relaxation of the directionally oriented, extended polymer chains in the polymer melt. The ratio of the shear loss modulus and the shear storage modulus (G"/G'), which is defined as tan δ, is proportional to the loss versus storage of energy at a given strain rate. In a material with tan δ less than 1, the storage of energy predominates at the measured strain rate. In a material with tan δ greater than 1, the loss (dissipation) of energy predominates at the measured strain rate. Further, a comparison of tan δ (e.g., a ratio of tan δ) measured at different strain rates can be used to quantify the degree to which the predominance of energy loss and energy storage change in the material with changes in the strain rate.

The shear storage modulus and shear loss modulus can be measured by various techniques and at various strains rates. However, if the moduli are to be used in accurately gauging melt relaxation in the polymer, both moduli should be measured at or near strain rates to which the polymer melt will be subjected during melt processing. To that end, the inventors believe that measurement of the shear storage modulus and shear loss modulus by parallel plate rheometer at angular frequencies of approximately 0.1 rad/s and approximately 10 rad/s provide a fair approximation of the strain rates to which the polyethylene polymer composition melt will be subjected during processing. As noted before, the ratio between tan δ at these two strain rates can be used to show changes in energy loss and energy storage as the strain rate changes. After extensive experimentation with various polymers and polymer compositions, it is believed that polyethylene polymers in which energy loss appreciably increases (i.e., tan δ appreciably increases) as the strain rate decreases (i.e., the angular frequency decreases) exhibit sufficient melt relaxation for heterogeneous nucleation with a salt of a branched alkyl phosphonic acid. In particular, it is believed that the ratio between tan δ at approximately 0.1 rad/s and tan δ at approximately 10 rad/s is particularly useful at identifying polymers that exhibit desirable levels of melt relaxation. However, the ratio of tan δ values at which sufficient melt relaxation occurs has also been determined to be affected by the molecular weight of the polymer, with polymers having a higher molecular weight requiring a higher ratio to achieve sufficient melt relaxation. Thus, the ratio between tan δ values needs an additional factor to account for the effect of the polymer's molecular weight. The molecular weight of a polymer is generally inversely proportional to the melt flow index of the polymer. Further, the relationship between molecular weight and melt flow index is not linear—it is more generally logarithmic in nature. Accordingly, the ratio between tan δ values can be augmented to account for the molecular weight effect by multiplying the ratio by the sum of 1 and the natural logarithm of the melt flow index of the polymer. The resulting parameter, which is hereafter referred to as the "Melt Relaxation Index," should be 2 or greater. In other words, the polyethylene polymer composition preferably has a Melt Relaxation Index of 2 or greater, more preferably 2.1 or greater.

As noted above, the Melt Relaxation Index (MRI) is defined as the product of (i) the sum of 1 and the natural logarithm of the melt flow index of the polymer and (ii) the ratio between tan δ at approximately 0.1 rad/s and tan δ at approximately 10 rad/s:

$$MRI = (1 + \log(MFI)) \times \frac{\tan\delta_{0.1\,rad/s}}{\tan\delta_{10\,rad/s}}$$

In the definition, the two angular frequencies have been defined as being approximately equal to a given value. Thus, tan δ at approximately 0.1 rad/s can be measured at any angular frequency between 0.095 and 0.105 rad/s, and tan δ at approximately 10 rad/s can be measured at any angular frequency between 9.5 rad/s and 10.5 rad/s. While the exact angular frequencies used in determining MRR can vary within the ranges noted above, the ratio of the two angular frequencies must be 0.01 (i.e., there must be a 100-fold difference between the two angular frequencies). The melt flow index of the polymer, which can be reported in units of decigrams per minute (dg/min) or grams per 10 minutes (g/10 min), is measured in accordance with ASTM Standard D1238 at 190° C. using a 2.16 kg load.

The Melt Relaxation Index can be measured by any suitable technique. Preferably, the shear loss modulus (G"), the shear storage modulus (G), and tan δ are determined by parallel plate rheometry at a temperature of 190° C. using a rotational rheometer equipped with 25 mm parallel plates set at a 1.1 mm gap. The polymer sample used for measurement is provided in the form of a compression molded disc. During the measurement, the angular distance or strain preferably is kept low to remain in the non-hysteresis region, with a nominal strain of approximately one percent being preferred. Since these parameters are determined from the polymer melt, the presence of the nucleating agent will not have any appreciable effects on the shear loss modulus (G'), the shear storage modulus (G), tan δ, or melt flow index measured from the polyethylene polymer composition. Therefore, these parameters (and the Melt Relaxation Index) can be measured from the polyethylene polymer composition before it is combined with the salt of a branched alkyl phosphonic acid, or the parameters can be measured from a polymer composition comprising the polyethylene polymer composition and the salt of a branched alkyl phosphonic acid.

As noted above, the polyethylene polymer composition can comprise any suitable polyethylene polymer or mixture of polyethylene polymers exhibiting the desired Melt Relaxation Index. Thus, the polyethylene polymer composition can comprise a single polyethylene polymer exhibiting the desired Melt Relaxation Index. Alternatively, the polyethylene polymer composition can comprise a mixture of two or more polyethylene polymers in which the mixture exhibits the desired Melt Relaxation Index. In such a mixture, each polyethylene polymer can exhibit a Melt Relaxation Index falling within the desired range, but this is not necessary. For example, a polyethylene polymer exhibiting a relatively low Melt Relaxation Index (e.g., less than 2) can be mixed with an appropriate amount of another polyethylene polymer having a higher Melt Relaxation Index (e.g., 2.1 or more) to yield a polyethylene polymer composition exhibiting the desired Melt Relaxation Index.

As noted above, the polymer composition also comprises a salt of a branched alkyl phosphonic acid. As utilized herein, the term "branched alkyl phosphonic acid" refers to phosphonic acids of Formula (C) below (C)

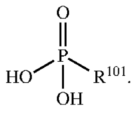

In Formula (C), $R^{101}$ is a branched alkyl group. The salt of the branched alkyl phosphonic acid can comprise any suitable cation(s). In a preferred embodiment, the salt of the branched alkyl phosphonic acid comprises one or more cations selected from the group consisting of Group 1 element cations, Group 2 element cations, and Group 12 element cations. In a preferred embodiment, the salt of the branched alkyl phosphonic acid comprises a Group 1 element cation, preferably two sodium cations. In another preferred embodiment, the salt of the branched alkyl phosphonic acid comprises a Group 2 element cation. In a particularly preferred embodiment, the salt of the branched alkyl phosphonic acid comprises a calcium cation.

The branched alkyl phosphonic acid can comprise any suitable branched alkyl group (i.e., $R^{101}$ can be any suitable branched alkyl group). In a preferred embodiment, the branched alkyl phosphonic acid comprises a branched alkyl group selected from the group consisting of isopropyl, sec-butyl, isobutyl, tert-butyl, tert-pentyl, neopentyl, isopentyl, sec-pentyl, sec-isopentyl, pentan-3-yl, and 2-methylbutyl. In another preferred embodiment, the branched alkyl phosphonic acid comprises an alkyl group with a branch point located at the alpha-carbon or beta-carbon relative to the phosphorus atom, with a branch point at the alpha-carbon being particularly preferred. In a preferred embodiment, the branched alkyl phosphonic acid comprises a tertiary alkyl group (i.e., an alkyl group comprising at least one carbon atom bonded to four non-hydrogen substituents, such as three alkyl groups and the phosphorus atom). In a preferred embodiment, the branched alkyl phosphonic acid comprises a branched alkyl group selected from the group consisting of tert-butyl, tert-pentyl, and neopentyl. In a particularly preferred embodiment, the branched alkyl phosphonic acid comprises a tert-butyl group (i.e., $R^{101}$ is tert-butyl). Thus, in a preferred embodiment, the salt of the branched alkyl phosphonic acid is selected from the group consisting of the disodium salt of tert-butylphosphonic acid, the calcium salt of tert-butylphosphonic acid (i.e., calcium t-butylphosphonate or calcium t-butylphosphonate monohydrate), and mixtures thereof. In another particularly preferred embodiment, the salt of the branched alkyl phosphonic acid is the calcium salt of tert-butylphosphonic acid (i.e., calcium t-butylphosphonate or calcium t-butylphosphonate monohydrate).

The salt of the branched alkyl phosphonic acid can have any suitable specific surface area (e.g., BET specific surface area). In a preferred embodiment, the salt of the branched alkyl phosphonic acid has a BET specific surface area of about 20 $m^2/g$ or more. In another preferred embodiment, the salt of the branched alkyl phosphonic acid has a BET specific surface area of about 30 $m^2/g$ or more. The BET specific surface area of the salt of the branched alkyl phosphonic acid can be measured by any suitable technique. Preferably, the BET specific surface area of the salt of the branched alkyl phosphonic acid is measured in accordance with ISO Standard 9277:2010, which is entitled "Determination of the Specific Surface Area of Solids by Gas Adsorption—BET method," using nitrogen as the adsorbing gas. The salts of branched alkyl phosphonic acids disclosed herein generally have a layered structure that can be exfoliated using techniques known in the art. Such exfoliation of the layered structure increases the BET specific surface area of the salt of the branched alkyl phosphonic acid, which aids in dispersion. Physical methods of increasing the BET surface area of the salt of the branched alkyl phosphonic acid include air jet milling, pin milling, hammer milling, grinding mills, and the like. Improved dispersion and surface area can also be achieved through more rigorous mixing and extrusion methods, such as high-intensity mixing and twin-screw extrusion. Thus, those salts of branched alkyl phosphonic acids that do not have the desired BET specific surface area can be exfoliated using these and other known techniques until the desired BET specific surface area is achieved.

The polymer composition can contain any suitable amount of the salt of the branched alkyl phosphonic acid. In a preferred embodiment, the salt of the branched alkyl phosphonic acid is present in the polymer composition in an amount of about 50 parts-per-million (ppm) or more, based on the total weight of the polymer composition. In another preferred embodiment, the salt of the branched alkyl phosphonic acid is present in the polymer composition in an amount of about 75 ppm or more, about 100 ppm or more, about 150 ppm or more, about 200 ppm or more, or about 250 ppm or more, based on the total weight of the polymer composition. The salt of the branched alkyl phosphonic acid preferably is present in the polymer composition in an amount of about 5,000 ppm or less, based on the total weight of the polymer composition. In a preferred embodiment, the salt of the branched alkyl phosphonic acid preferably is present in the polymer composition in an amount of about 4,000 ppm or less, about 3,000 ppm or less, about 2,000 ppm or less, about 1,500 ppm or less, about 1,250 ppm or less, or about 1,000 ppm or less, based on the total weight of the polymer composition. Thus, in a series of preferred embodiments, the salt of the branched alkyl phosphonic acid is present in the polymer composition in an amount of about 50 ppm to about 5,000 ppm (e.g., about 50 ppm to about 4,000 ppm, about 50 ppm to about 3,000 ppm, about 50 ppm to about 2,000 ppm, about 50 ppm to about 1,500 ppm, about 50 ppm to about 1,250 ppm, or about 50 ppm to about 1,000 ppm), about 75 ppm to about 5,000 ppm (e.g., about 75 ppm to about 4,000 ppm, about 75 ppm to about 3,000 ppm, about 75 ppm to about 2,000 ppm, about 75 ppm to about 1,500 ppm, about 75 ppm to about 1,250 ppm, or about 75 ppm to about 1,000 ppm), about 100 ppm to about 5,000 ppm (e.g., about 100 ppm to about 4,000 ppm, about 100 ppm to about 3,000 ppm, about 100 ppm to about 2,000 ppm, about 100 ppm to about 1,500 ppm, about 100 ppm to about 1,250 ppm, or about 100 ppm to about 1,000 ppm), about 150 ppm to about 5,000 ppm (e.g., about 150 ppm to about 4,000 ppm, about 150 ppm to about 3,000 ppm, about 150 ppm to about 2,000 ppm, about 150 ppm to about 1,500 ppm, about 150 ppm to about 1,250 ppm, or about 150 ppm to about 1,000 ppm), about 200 ppm to about 5,000 ppm (e.g., about 200 ppm to about 4,000 ppm, about 200 ppm to about 3,000 ppm, about 200 ppm to about 2,000 ppm, about 200 ppm to about 1,500 ppm, about 200 ppm to about 1,250 ppm, or about 200 ppm to about 1,000 ppm), about 250 ppm to about 5,000 ppm (e.g., about 250 ppm to about 4,000 ppm, about 250 ppm to about 3,000 ppm, about 250 ppm to about 2,000 ppm, about 250 ppm to about 1,500 ppm, about 250 ppm to about 1,250 ppm, or about 250 ppm to about 1,000 ppm), based on the total weight of the polymer composition. If the polymer composition comprises more than one salt of a branched alkyl phosphonic acid, each salt of a branched alkyl phosphonic acid can be present in the polymer composition in one of the amounts recited above, or the combined amount of all salts of branched alkyl phosphonic acids present in the polymer composition can fall within one of the ranges recited above. Preferably, when the polymer composition comprises more than one salt of a branched alkyl phosphonic acid, the combined amount of all salts of branched alkyl phosphonic acids present in the polymer composition falls within one of the ranges recited above.

The salts of branched alkyl phosphonic acids suitable for use in the compositions of the invention can be made by any suitable process. For example, the salts can be made by reacting in an aqueous medium the branched alkyl phosphonic acid and a metal base, such as a metal hydroxide (e.g., calcium hydroxide, sodium hydroxide, potassium hydroxide, magnesium hydroxide) or a metal oxide (e.g., calcium oxide or zinc oxide). The salts of branched alkyl phosphonic acids made by such a process can be hydrates (e.g., calcium t-butylphosphonate monohydrate). Such hydrate salts can be dehydrated by heating the salt to a sufficiently high temperature, but many of such dehydrated salts (e.g., calcium t-butylphosphonate) are sufficiently unstable that they rehydrate upon exposure to atmospheric moisture.

The polymer composition of the invention can contain other polymer additives in addition to the aforementioned salt(s) of the branched alkyl phosphonic acid(s). Suitable additional polymer additives include, but are not limited to, antioxidants (e.g., phenolic antioxidants, phosphite antioxidants, and combinations thereof), anti-blocking agents (e.g., amorphous silica and diatomaceous earth), pigments (e.g., organic pigments and inorganic pigments) and other colorants (e.g., dyes and polymeric colorants), fillers and reinforcing agents (e.g., glass, glass fibers, talc, calcium carbonate, and magnesium oxysulfate whiskers), nucleating agents, clarifying agents, acid scavengers (e.g., metal salts of fatty acids, such as the metal salts of stearic acid, and hydrotalcite-like materials), polymer processing additives (e.g., fluoropolymer polymer processing additives), polymer cross-linking agents, slip agents (e.g., fatty acid amide compounds derived from the reaction between a fatty acid and ammonia or an amine-containing compound), fatty acid ester compounds (e.g., fatty acid ester compounds derived from the reaction between a fatty acid and a hydroxyl-containing compound, such as glycerol, diglycerol, and combinations thereof), polymer modifiers (e.g., hydrocarbon resin modifiers such as those sold under the Oppera™ tradename by Exxon Mobil Corporation), and combinations of the foregoing.

In a preferred embodiment, the polymer composition further comprises one or more acid scavengers. As noted above, suitable acid scavengers include metal salts of fatty acids and hydrotalcite-like materials (e.g., synthetic hydrotalcites). Suitable metal salts of fatty acids include, but are not limited to, the metal salts of $C_{12}$-$C_{22}$ fatty acids (e.g., saturated $C_{12}$-$C_{22}$ fatty acids), such as stearic acid. In a preferred embodiment, the acid scavenger is selected from the group consisting of the zinc, potassium, and lanthanum salts of stearic acid, with zinc stearate being particularly preferred. Hydrotalcite-like materials suitable for use as acid scavengers include, but are not limited to, the synthetic hydrotalcite materials (CAS No. 11097-59-9) sold by Kisuma Chemicals under the "DHT-4A" and "DHT-4V" tradenames.

The salt(s) of the branched alkyl phosphonic acid(s) and the acid scavenger can be present in the polymer composition in any suitable relative amounts. For example, the salt(s) of the branched alkyl phosphonic acid(s) and the acid scavenger can be present in the polymer composition in a ratio (salt(s) of the branched alkyl phosphonic acid(s) to acid scavenger) of about 10:1 to about 1:10 based on the weight of the salt(s) of the branched alkyl phosphonic acid(s) and the acid scavenger in the polymer composition. More preferably, the salt(s) of the branched alkyl phosphonic acid(s) and the acid scavenger are present in the polymer composition in a ratio (salt(s) of the branched alkyl phosphonic acid(s) to acid scavenger) of about 4:1 to about 1:4, about 3:1 to about 1:3 (e.g., about 3:1 to about 1:1 or about 3:1 to about 2:1), about 1:1 to about 1:4, or about 1:1 to about 1:3 based on the weight of the salt(s) of the branched alkyl phosphonic acid(s) and the acid scavenger in the polymer composition. In a particularly preferred embodiment, the salt(s) of the branched alkyl phosphonic acid(s) and the acid scavenger are present in the polymer composition in a ratio of about 2:1 based on the weight of the salt(s) of the branched alkyl phosphonic acid(s) and the acid scavenger in the polymer composition (e.g., about 2 parts by weight calcium t-butylphosphonate monohydrate to 1 part by weight zinc stearate). In another particularly preferred embodiment, the salt(s) of the branched alkyl phosphonic acid(s) and the acid scavenger are present in the polymer composition in a ratio of about 3:1 based on the weight of the salt(s) of the branched alkyl phosphonic acid(s) and the acid scavenger in the polymer composition (e.g., about 3 parts by weight calcium t-butylphosphonate monohydrate to 1 part by weight zinc stearate).

As noted above, the polymer composition of the invention can contain other nucleating agents in addition to the salt(s) of the branched alkyl phosphonic acid(s) described above. Suitable nucleating agents include, but are not limited to, 2,2'-methylene-bis-(4,6-di-tert-butylphenyl) phosphate salts (e.g., sodium 2,2'-methylene-bis-(4,6-di-tert-butylphenyl) phosphate or hydroxyaluminum bis(2,2'-methylene-bis-(4,6-di-tert-butylphenyl)phosphate), bicyclo[2.2.1]heptane-2,3-dicarboxylate salts (e.g., disodium bicyclo[2.2.1]heptane-2,3-dicarboxylate or calcium bicyclo[2.2.1]heptane-2,3-dicarboxylate), cyclohexane-1,2-dicarboxylate salts (e.g., calcium cyclohexane-1,2-dicarboxylate, monobasic aluminum cyclohexane-1,2-dicarboxylate, dilithium cyclohexane-1,2-dicarboxylate, or strontium cyclohexane-1,2-dicarboxylate), glycerolate salts (e.g., zinc glycerolate), phthalate salts (e.g., calcium phthalate), phenylphosphonic acid salts (e.g., calcium phenylphosphonate), and combinations thereof. For the bicyclo[2.2.1]heptane-2,3-dicarboxylate salts and the cyclohexane-1,2-dicarboxylate salts, the carboxylate moieties can be arranged in either the cis- or trans-configuration, with the cis-configuration being preferred.

As noted above, the polymer composition of the invention can also contain a clarifying agent. Suitable clarifying agents include, but are not limited to, trisamides and acetal compounds that are the condensation product of a polyhydric alcohol and an aromatic aldehyde. Suitable trisamide clarifying agents include, but are not limited to, amide derivatives of benzene-1,3,5-tricarboxylic acid, derivatives of N-(3,5-bis-formylamino-phenyl)-formamide (e.g., N-[3,5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof. As noted above, the clarifying agent can be an acetal compound that is the condensation product of a polyhydric alcohol and an aromatic aldehyde. Suitable polyhydric alcohols include acyclic polyols such as xylitol and sorbitol, as well as acyclic deoxy polyols (e.g., 1,2,3-trideoxynonitol or 1,2,3-trideoxynon-1-enitol). Suitable aromatic aldehydes typically contain a single aldehyde group with the remaining positions on the aromatic ring being either unsubstituted or substituted. Accordingly, suitable aromatic aldehydes include benzaldehyde and substituted benzaldehydes (e.g., 3,4-dimethyl-benzaldehyde or 4-propyl-benzaldehyde). The acetal compound produced by the aforementioned reaction can be a mono-acetal, di-acetal, or tri-acetal compound (i.e., a compound containing one, two, or three acetal groups, respectively), with the di-acetal compounds being preferred. Suitable acetal-based clarifying agents include, but are not limited to, the clarifying agents disclosed in U.S. Pat. Nos. 5,049,605; 7,157,510; and 7,262,236.

The polymer composition of the invention can be produced by any suitable method or process. For example, the polymer composition can be produced by simple mixing of the individual components of the polymer composition (e.g., polymer, salt(s) of branched alkyl phosphonic acid(s), and other additives, if any). The polymer composition can also be produced by mixing the individual components under high shear or high intensity mixing conditions. The polymer composition of the invention can be provided in any form suitable for use in further processing to produce an article of manufacture from the thermoplastic polymer composition. For example, the thermoplastic polymer compositions can be provided in the form of a powder (e.g., free-flowing powder), flake, pellet, prill, tablet, agglomerate, and the like.

The polymer composition of the first embodiment invention can take the form of a masterbatch composition designed for addition or let-down into a virgin polymer (e.g., an unnucleated high-density polyethylene polymer). In such an embodiment, the polymer composition will generally contain a higher amount of the salt of the branched alkyl phosphonic acid as compared to a thermoplastic polymer composition intended for use in the formation of an article of manufacture without further dilution or addition to a virgin thermoplastic polymer. For example, the salt of the branched alkyl phosphonic acid can be present in such a polymer composition in an amount of about 0.5 wt. % or more (e.g., about 1 wt. % or more or about 2 wt. % or more). The maximum amount of the salt in the masterbatch is only limited by manufacturing and processing considerations, though the amount would typically be about 50 wt. % or less. Thus, in a series of preferred embodiments, the salt of the branched alkyl phosphonic acid can be present in the masterbatch in an amount of about 0.5 wt. % to about 50 wt. % (e.g., about 0.5 wt. % to about 40 wt. %, about 0.5 wt. % to about 30 wt. %, about 0.5 wt. % to about 25 wt. %, about 0.5 wt. % to about 20 wt. %, about 0.5 wt. % to about 15 wt. %, about 0.5 wt. % to about 10 wt. %, about 0.5 wt. % to about 5 wt. %, or about 0.5 wt. % to about 4 wt. %), about 1 wt. % to about 50 wt. % (e.g., about 1 wt. % to about 40 wt. %, about 1 wt. % to about 30 wt. %, about 1 wt. % to about 25 wt. %, about 1 wt. % to about 20 wt. %, about 1 wt. % to about 15 wt. %, about 1 wt. % to about 10 wt. %, about 1 wt. % to about 5 wt. %, or about 1 wt. % to about 4 wt. %), or about 2 wt. % to about 50 wt. % (e.g., about 2 wt. % to about 40 wt. %, about 2 wt. % to about 30 wt. %, about 2 wt. % to about 25 wt. %, about 2 wt. % to about 20 wt. %, about 2 wt. % to about 15 wt. %, about 2 wt. % to about 10 wt. %, about 2 wt. % to about 5 wt. %, or about 2 wt. % to about 4 wt. %), based on the total weight of the polymer composition. In such a masterbatch composition, any additional additives contained in the composition will likewise be present in higher amounts that are intended to deliver the desired concentration when the masterbatch composition is let-down in the virgin polymer.

The polymer composition of the invention is believed to be useful in producing thermoplastic polymer articles of manufacture. The polymer composition of the invention can be formed into a desired thermoplastic polymer article of manufacture by any suitable technique, such as injection molding (e.g., thin-wall injection molding, multicomponent molding, overmolding, or 2K molding), blow molding (e.g., extrusion blow molding, injection blow molding, or injection stretch blow molding), extrusion (e.g., fiber extrusion, tape (e.g., slit tape) extrusion, sheet extrusion, film extrusion, cast film extrusion, pipe extrusion, extrusion coating, or foam extrusion), thermoforming, rotomolding, film blowing (blown film), film casting (cast film), compression molding, extrusion compression molding, extrusion compression blow molding, and the like. Thermoplastic polymer articles made using the polymer composition of the invention can be comprised of multiple layers (e.g., multilayer blown or cast films or multilayer injection molded articles), with one or any suitable number of the multiple layers containing a polymer composition of the invention.

The polymer composition of the invention can be used to produce any suitable article of manufacture. Suitable articles of manufacture include, but are not limited to, medical devices (e.g., pre-filled syringes for retort applications, intravenous supply containers, and blood collection apparatus), food packaging, liquid containers (e.g., containers for drinks, medications, personal care compositions, shampoos, and the like), apparel cases, microwavable articles, shelving, cabinet doors, mechanical parts, automobile parts, sheets, pipes, tubes, rotationally molded parts, blow molded parts, films, fibers, and the like.

Certain polyethylene articles containing one of the salts of a branched alkyl phosphonic acid described above have been observed to exhibit markedly lower water vapor and oxygen transmission rates. For example, these improvements in barrier to water vapor and oxygen have been observed for high-density polyethylene films containing one of the salts of a branched alkyl phosphonic acid described above. Thus, in a second embodiment, the invention provides a polyethylene film having improved barrier to water vapor and oxygen. The film comprises (i) a high-density polyethylene polymer having a density of about 930 $kg/m^3$ to about 970 $kg/m^3$ and (ii) a salt of a branched alkyl phosphonic acid. The high-density polyethylene polymer present in the film can be any of the high-density polyethylene polymers described above in connection with the polymer composition embodiment of the invention. In a preferred embodiment, the high-density polyethylene polymer has a multimodal molecular weight distribution with two or more local maxima. The salt of a branched alkyl phosphonic acid present in the film can be any of the salts of branched alkyl phosphonic acids described above in connection with the polymer composition embodiment of the invention. In a preferred embodiment, the salt of the branched alkyl phosphonic acid is the calcium salt of tert-butylphosphonic acid (e.g., calcium t-butylphosphonate monohydrate).

As noted above, the polyethylene film has improved barrier to water vapor and oxygen as demonstrated by its markedly improved water vapor and oxygen transmission rates. In a preferred embodiment, the film has a normalized oxygen transmission rate (nOTR) of about 300 $cm^3 \cdot mil\ m^{-2}\ day^{-1}\ (0.209\ atm)^{-1}$ or less, about 275 $cm^3 \cdot mil\ m^{-2}\ day^{-1}\ (0.209\ atm)^{-1}$ or less, about 250 $cm^3 \cdot mil\ m^{-2}\ day^{-1}\ (0.209\ atm)^{-1}$ or less, about 225 $cm^3 \cdot mil\ m^{-2}\ day^{-1}\ (0.209\ atm)^{-1}$ or less, or about 200 $cm^3 \cdot mil\ m^{-2}\ day^{-1}\ (0.209\ atm)^{-1}$ or less. In another preferred embodiment, the film has a normalized water vapor transmission rate (nWVTR) of about 3 $g\ mil\ m^{-2}\ day^{-1}$ or less, about 2.5 $g\ mil\ m^{-2}\ day^{-1}$ or less, about 2 $g\ mil\ m^{-2}\ day^{-1}$ or less, or about 1.75 $g\ mil\ m^{-2}\ day^{-1}$ or less. In addition to these barrier improvements, the polyethylene film generally has a desirable combination of low haze, high clarity, and high gloss. For example, a polyethylene film of the invention having a thickness of about 3 mils can exhibit a haze of about 20% or less (e.g., about 15% or less) and/or a clarity of about 90% or greater (e.g., about 95% or greater). In a preferred embodiment, the polyethylene film has a gloss of about 80% or greater (e.g., about 90% or greater).

The disclosed thermoplastic polymer composition is believed to be well-suited for use in extrusion blow molding and film blowing processes because of its exceptionally improved (i.e., lower) water vapor and oxygen transmission rates as compared to the unnucleated polymer as well as nucleated polymers that do not exhibit the described physical properties (e.g., density, Melt Relaxation Index, Melt Flow Index, etc.). For example, a blown film made from the disclosed thermoplastic polymer composition has been observed to exhibit a markedly lower water vapor transmission rate than a similar blown film made from a nucleated polymer that does not exhibit the desired Melt Relaxation Index. As described noted above, this result is believed to be attributable to the selection of a polyethylene polymer composition that exhibits sufficient melt relaxation to maximize the nucleating effects of the salt of a branched alkyl phosphonic acid.

Thus, in a third embodiment, the invention provides a method for producing a film from a thermoplastic polymer composition. The method comprises the steps of:

(a) providing an apparatus comprising:
  (i) a die having an annular die orifice adapted to extrude a tube;
  (ii) a means for blowing pressurized fluid into the tube exiting the annular die orifice; and
  (iii) a means for drawing and collecting the tube;
(b) providing a polymer composition comprising (i) a polyethylene polymer composition having a Melt Relaxation Index of 2 or greater; and (ii) a salt of a branched alkyl phosphonic acid;
(c) heating the polymer composition to a temperature sufficient to melt the polymer composition so that it may be extruded through the die;
(d) extruding the molten polymer composition through the annular die orifice to form a tube exiting the annular die orifice in a first direction, the tube having a diameter and a length;
(e) blowing a pressurized fluid into the tube under sufficient pressure to inflate the tube and increase its diameter while simultaneously drawing the tube in the first direction to increase its length, thereby producing a film;
(f) allowing the film to cool to a temperature at which the polymer composition solidifies; and
(g) collecting the film.

The polymer composition utilized in the method of this second embodiment can be any of the polymer compositions described above. The apparatus used in practicing the method of the invention can be any suitable blown film apparatus. For example, the film blowing machine can be equipped with a single extruder and annular die that produces a monolayer film. Alternatively, the film blowing machine can be equipped with multiple extruders and an appropriate distribution die adapted to combine multiple but separate layers in the melt. The films produced by such a film blowing machine would be multilayer films. When a multilayer film is produced, the polymer composition of the invention can be used to produce any one or more layers of the multilayer film. In other words, the method described above encompasses methods of producing multilayer films in which all layers of the film are produced using the recited polymer composition as well as multilayer films in which the recited polymer composition is used to produce at least one layer of the multilayer film and one or more additional polymer compositions are used to produce the remaining layers of the multilayer film.

In the method described above, the polymer composition can be heated to any suitable temperature that melts the polymer composition and allows it to be extruded through the die. The temperature to which the thermoplastic polymer composition is heated does not have a significant effect on the nucleation performance of the salt of a branched alkyl phosphonic acid, but higher temperatures may promote greater and faster melt relaxation which could, in turn, improve nucleation performance to some degree. However, the temperature to which the polymer composition is heated should not be excessively high, which may lower the viscosity of the molten polymer composition to a point where the tube ruptures when it is inflated by the pressurized fluid. Preferably, the polymer composition is heated to a temperature of about 150° C. to about 220° C. The polymer composition can initially be heated to a temperature of about 150° C. to about 170° C. in the feed throat of the extruder followed by heating to a temperature of about 180° C. to about 220° C. in the final zones of the extruder. Once heated to the desired temperature, the molten polymer composition preferably is maintained at the desired temperature until it is extruded through the annular die orifice. Depending on polymer characteristics, those of ordinary skill in the art of blown film production will recognize the need for temperature adjustments to maintain an appropriate compromise between mass output, system back pressures, and bubble (tube) stability.

The tube of polymer exiting the annular die orifice can be inflated to the desired diameter using any suitable pressure. The pressure required to inflate the tube depends upon several factors, such as the temperature of the molten polymer composition exiting the annular die orifice, the extent to which the diameter of the tube is to be increased, and the desired thickness of the resulting film. Therefore, in practice, the pressure typically is adjusted by the machine operator until a film having the desired properties is obtained.

The film produced by the method described above can be collected in any suitable manner. For example, the inflated tube is generally collapsed into a flattened form by two or more nip rollers. The collapsed tube, or layflat, can be collected in this flattened form or the edges of the layflat can be slit to yield two separate films, which separate films can then be collected.

The following examples further illustrate the subject matter described above but, of course, should not be construed as in any way limiting the scope thereof.

Example 1

This example demonstrates the production of polymer compositions according to the invention and the improved properties exhibited by cast films made from such polymer compositions.

The cast films were made using a high-density polyethylene polymer (HDPE), specifically Sclair 2908 from Nova Chemicals. The polymer is reported to have a density of 961 kg/$m^3$ and a melt flow index of 7.0 dg/min. The granular resin was ground into a powder prior to compounding with the additives described below.

The samples were made by mixing the ground HDPE resin with 638 ppm of the indicated phosphonate salt, 319 ppm of zinc stearate, 300 ppm of Irganox® 1010 antioxidant, and 600 ppm of Irgafos® 168 antioxidant. The control sample was made by mixing the ground HDPE resin with 300 ppm of Irganox® 1010 antioxidant and 600 ppm of Irgafos® 168 antioxidant. The combined ingredients were mixed in a 10 L Henschel high intensity mixer at 2,000 rpm for approximately 2.5 minutes.

Each resulting mixture was compounded through a Deltaplast single screw extruder equipped with a 1-inch diameter screw having LID of 30 with Maddock mixing section. The temperature profile of the four barrel zones from front to end was 160° C., 175° C., 190° C., and 190° C. A short cylindrical strand die was connected to the end with the temperature set at 190° C. The polymer strand was water cooled and cut to granular size with a standard pelletizer. The extruder was purged with HDPE resin between each sample.

Prior to making films, each compounded sample was bag mixed with 6 wt. % of a linear low-density polyethylene (LLDPE) resin. The LLDPE resin used was Dowlex 2035 having a reported density of 919 kg/$m^3$ and a melt flow index of 6.0 dg/min. The LLDPE resin was added to facilitate a consistent feed rate during the extrusion of the film.

Films were extruded on a Killion lab system. The system was equipped with a single screw extruder having 1-inch screw diameter and L/D of 24 with an Egan mixing section. During processing, the first zone of the extruder was set at 180° C., the remaining zones and transfer line were set at 205° C. The polymer melt from the extruder was spread through a 150 mm film die with the adjustable die lip set to a 0.5 mm gap and a T-shape coat hanger spreading geometry at 205° C. onto a 12-in laboratory-scale chill roll following with a tension wind haul-off system. The chill roll temperature was maintained at 85° C. by coolant. The extruder screw speed was set at 60 rpm to yield 3.6 kg/hour line output. Chill roll surface rolling speed was set at 19 feet/min. The foregoing setup provided a targeted film thickness of approximately 3 mil.

Haze and clarity of the resulting films were measured in accordance with ASTM D1003 using a BYK haze-gard Transparency Transmission haze meter. Gloss was measured using a BYK single angle 45° micro-gloss meter with film placed on a matte finish vacuum table to avoid back-side reflectance. The crystallization temperatures of the films were measured using a Mettler Toledo differential scanning calorimetry (DSC) unit with a heating/cooling rate of 20° C./min over the temperature range of 60 to 200° C.

Oxygen transmission rates (OTR) for extruded films were measured according to ASTM F3136 with a MOCON OpTech®-O2 Model P unit, along with a Mocon film permeation cell (50 $cm^2$ surface area; 12.0 $cm^3$ cell volume on sensor side of film). The unit (sensor and cell) was placed in a laboratory with controlled temperature and humidity (23° C. and 50% relative humidity per ASTM D618-08). The sensor side of the cell (below film) was pre-swept for ten minutes with dry, low-oxygen nitrogen, while the top or "insult" side of the film was swept with low dew point house compressed air resulting in 0.209 atmosphere oxygen insult. To account for minor film thickness variation, results were normalized to 1.0 mil thickness for more direct comparison. The result is a normalized oxygen transmission rate (nOTR) having the units $cm^3 \cdot mil \cdot m^{-2} \cdot day^{-1} \cdot (0.209\ atm)^{-1}$.

TABLE 1

Crystallization temperature, haze, normalized oxygen transmission rate (nOTR), and gloss results for cast films.

| Sample | $T_c$ (° C.) | Haze (%) | nOTR ($cm^3 \cdot$ mil $m^{-2}$ $day^{-1}$ (0.209 $atm)^{-1}$) | Gloss (%) |
|---|---|---|---|---|
| Control | 122.7 | 73.8 | 777 | 14 |
| Calcium t-butylphosphonate | 123.9 | 18.0 | 248 | 92 |
| Dilithium t-butylphosphonate | 123.8 | 53.5 | 565 | 24 |
| Disodium t-butylphosphonate | 123.6 | 35.6 | 404 | 42 |
| Magnesium t-butylphosphonate | 123.8 | 42.0 | 528 | 34 |
| Zinc t-butylphosphonate | 123.6 | 37.3 | 538 | 38 |
| Calcium isoamylphosphonate | 124.1 | 41.6 | 493 | 45 |
| Zinc isoamylphosphonate | 124.2 | 44.1 | 480 | 38 |
| Calcium n-propylphosphonate | 123.7 | 40.6 | 619 | 40 |
| Calcium n-octylphosphonate | 123.5 | 50.0 | 661 | 31 |
| Calcium n-decylphosphonate | 123.4 | 54.7 | 677 | 27 |
| Calcium n-dodecylphosphonate | 123.4 | 58.8 | 663 | 26 |
| Zinc n-propylphosphonate | 123.5 | 46.1 | 624 | 32 |
| Zinc n-octylphosphonate | 123.4 | 52.1 | 672 | 29 |
| Zinc n-decylphosphonate | 123.3 | 56.1 | 724 | 27 |
| Zinc n-dodecylphosphonate | 123.3 | 66.0 | 818 | 16 |

As can be seen from the data in Table 1, the films made with a salt of a branched alkyl phosphonic acid exhibited a desirably low nOTR (less than 600 $cm^3 \cdot mil \cdot m^{-2} \cdot day^{-1}$ $(0.209\ atm)^{-1}$), with some films also exhibiting low haze and high gloss. These data suggest that such salts are effective nucleating agents for the polyethylene polymer. Among these salts, the data show that calcium t-butylphosphonate (specifically, calcium t-butylphosphonate monohydrate) is particularly effective at improving the physical properties of the film. Indeed, the film made with calcium t-butylphosphonate shows an nOTR that is approximately 68% lower than the nOTR of the control film. Such a dramatically low nOTR makes such films particularly useful for packaging goods that must be protected from oxygen, such as meats. Furthermore, this dramatic increase in nOTR was accompanied by a significant decrease in haze (by approximately 75%) and an increase in gloss relative to the control film. Thus, not only does the film made with the calcium t-butylphosphonate provide very desirable barrier properties, the film also exhibits optical properties that would make it an attractive option for packaging goods.

Example 2

This example demonstrates the production of polymer compositions according to the invention and the improved properties exhibited by blown films made from such polymer compositions.

The blown films were made using a blend of a high molecular weight HDPE and a low molecular weight HDPE. In particular, Sclair 19C (from Nova Chemicals) served as high molecular weight HDPE. This HDPE resin is reported to have a density of 958 kg/$m^3$ and a melt flow index of 0.95 dg/min. The low molecular weight resin was DMDA 8007 (from Dow Chemical), which is reported to have a density of 965 kg/$m^3$ and a melt flow index of 8.3 dg/min. The two HDPE resins were blended in a ratio of 7.5 parts by weight Sclair 19C to 2.5 parts by weight DMDA 8007. In particular, 75 kg of 19C pellets and 25 kg of 8007 pellets were weighed separately, combined, and mixed evenly in a Munson mixer. The resulting resin blend was then compounded using an MPM single screw extruder. The temperature settings from zone 1 to zone 3 were 162° C., 176° C. and 190° C., and the temperature of the die was 190° C. The polymer strands exiting the die were transferred into a water bath after extruding the first 1 kg of material. The polymer strands were cut to granular size with a standard pelletizer. The compounded HDPE blend was passed through a Munson mixer a second time to ensure even distribution. The granular compounded HDPE resin blend was ground to a powder before subsequent use as described below. This ground, compounded HDPE resin blend is referred to as "HDPE Resin Blend 1" below.

The samples used in making blown films were made by mixing HDPE Resin Blend 1 with 600 ppm of the indicated phosphonate salt, 300 ppm of zinc stearate, 300 ppm of Irganox® 1010 antioxidant, and 600 ppm of Irgafos® 168 antioxidant. The control sample was made by mixing HDPE Resin Blend 1 with 300 ppm of Irganox® 1010 antioxidant and 600 ppm of Irgafos® 168 antioxidant. The combined ingredients were mixed in a 10 L Henschel high intensity mixer at 2,000 rpm for approximately 2.5 minutes.

After mixing, each blend of HDPE and additives was compounded together using a Prism twin screw extruder. The temperature profile of zone 1 to zone 4 from front to end was 170° C., 175° C., 185° C., and 190° C.; and the temperature of the die was 160° C. The screw speed of the extruder was set to 400 rpm. The polymer strands were transferred to a water bath after the first 200 g of material was extruded. The cooled polymer strands were cut to granular size with a standard pelletizer.

Prior to making films, each sample was bag mixed with 3 wt. % of processing agent 10476-11, a masterbatch provided by Colortech, Inc. containing 3.0% active fluorinated resin polymer processing aid in a linear low-density polyethylene (LLDPE) carrier resin having an MFI of 2 dg/min.

Films were extruded on a Labtech Engineering monolayer blown film line equipped with a 25-mm barrel extruder (L/D 30) with Maddock mixing section and pineapple tip, interfaced to a monolayer spiral mandrel die with 40-mm die lip set, die gap 1.2 mm, dual lip air ring, guide cage, collapsing frame, and haul-off system to wind-up film rolls. The feed throat zone was at 180° C. and all other extruder and die zones at 210° C. Screw speed was 110 rpm to give 5.0 kg/hour feed rate. Haul-off and air ring blower speeds were adjusted to make films at approximately 2.0 mil with frost line height 13 cm.

The optical properties, crystallization temperature, and nOTR of the films were measured as described above. The water vapor transmission rates (WVTR) of selected film were measured in accordance with ASTM F 1249 (100° F., 90% RH) using an Illinois Instruments Model 7011 water vapor permeation analyzer. Results were normalized to 1.0 mil to account for minor thickness variations and ease of direct comparison, giving units of g·mil·$m^{-2}$·$day^{-1}$.

TABLE 2

Crystallization temperature, haze, clarity, normalized oxygen transmission rate (nOTR), and normalized water vapor transmission rate (nWVTR) results for blown films.

| Sample | Tc (° C.) | Haze (%) | Clarity (%) | nOTR ($cm^3$ · mil $m^{-2}$ $day^{-1}$ $(0.209\ atm)^{-1}$) | nWVTR (g · mil · $m^{-2}$ · $day^{-1}$) |
|---|---|---|---|---|---|
| Control | 124.2 | 44.6 | 93.1 | 744 | 5.45 |
| Calcium t-butylphosphonate | 124.2 | 15.2 | 98.7 | 215 | 1.84 |
| Dilithium t-butylphosphonate | 124.2 | 37.8 | 94.7 | 522 | — |
| Disodium t-butylphosphonate | 124.2 | 34.9 | 96.4 | 394 | — |
| Magnesium t-butylphosphonate | 124.3 | 41.2 | 94.0 | 540 | — |
| Zinc t-butylphosphonate | 124.3 | 41.4 | 93.7 | 581 | — |

As can be seen from the data in Table 2, the blown films made with a salt of a branched alkyl phosphonic acid exhibited a desirably low nOTR (less than 600 $cm^3$·mil·$m^{-2}$·$day^{-1}$·$(0.209\ atm)^{-1}$), with some of the films also exhibiting low haze and high clarity. These data suggest that such salts are effective nucleating agents for the polyethylene polymer. Among these salts, the data show that calcium t-butylphosphonate (specifically, calcium t-butylphosphonate monohydrate) is particularly effective at improving the physical properties of the film. Indeed, the film made with calcium t-butylphosphonate shows an nOTR that is approximately 72% lower than the nOTR of the control film. Further, the film made with calcium t-butylphosphonate had an nWVTR that was approximately 66% lower than the nWVTR of the control film. These improvements in barrier properties were accompanied by a significant decrease in haze (by approximately 66%) relative to the control film. Thus, not only does the film made with the calcium t-butylphosphonate provide very desirable barrier properties, the film also exhibits optical properties that would make it an attractive option for packaging goods.

Example 3

This example demonstrates the production of polymer compositions according to the invention and the improved properties exhibited by injection molded articles made from such polymer compositions.

The injection molded articles were made using Sclair 2908 HDPE from Nova Chemicals. The polymer is reported to have a density of 961 kg/$m^3$ and a melt flow index of 7.0 dg/min. The granular resin was ground into a powder prior to compounding with the additives described below.

The samples were made by mixing the ground HDPE resin with 600 ppm of the indicated phosphonate salt, 300 ppm of zinc stearate, 300 ppm of Irganox® 1010 antioxidant, and 600 ppm of Irgafos® 168 antioxidant. The control sample was made by mixing the ground HDPE resin with 300 ppm of Irganox® 1010 antioxidant and 600 ppm of Irgafos® 168 antioxidant. The combined ingredients were mixed in a 30 L Henschel high intensity mixer at 2000 rpm for approximately 3 minutes.

Each resulting mixture was compounded using a Leistritz ZSE-18 twin screw extruder. The extruder was purged with Sclair 2908 HDPE resin before each sample. The temperature profile for all zones was set from 155° C. to 165° C.; and the temperature of the die was 155° C. The screw speed was set at 500 rpm, and the feed rate was 3.5 kg/hr. The polymer strands were transferred to a water bath after extruding the first 200 g of material. The cooled polymer strands were cut to granular size with a standard pelletizer.

Each compounded sample was molded into ISO shrinkage plaques in accordance with ISO 294 using a 55-ton Arburg injection molder. The mold has a dual cavity, and the plaque dimensions were 60.0 mm in length, 60.0 mm in width and 2.0 mm in height. The temperature of the throat was 40° C. The first four zones of the barrel were set at 210° C., and the last zone was set at 230° C. The mold temperature was set at 40° C. The total cycle time was 40-45 seconds. The resulting ISO shrinkage plaques were submitted for measurement of crystallization temperature and plaque shrinkage in the machine direction (MD) and transverse direction (TD).

Each compounded sample was also molded into plaques used for OTR and WVTR measurements. Specifically, each compounded sample was molded into plaques using a Husky 90-ton injection molder connected with a custom end-gate square mold with dimensions of 4.0 inch length, 4.0 inch width, and 1.0 mm height. The temperature profiles of the extruder's zone 1 to zone 3 from front to end were set at 230° C., 230° C., and 230° C. The nozzle was set at 250° C., and the mold was set at 35° C. The cycle time was 22.3 seconds with cooling time at 10 seconds. The maximum injection pressure was 1,140 psi. The resulting square plaques could be directly mounted on the oxygen permeation analyzer and water vapor transmission analyzer and are referred to as herein "barrier plaques." The barrier plaques were submitted for measurement of optical properties, OTR and WVTR as described above and using the same equipment and ISO or ASTM methods.

TABLE 3

Crystallization temperature, machine direction shrinkage, and transverse direction shrinkage measured from ISO shrinkage plaques.

| Sample | $T_c$ (° C.) | MD (%) | TD (%) |
|---|---|---|---|
| Control | 123.6 | 1.81 ± 0.04 | 1.16 ± 0.04 |
| Calcium t-butylphosphonate | 124.4 | 1.57 ± 0.01 | 0.26 ± 0.01 |

TABLE 4

Haze, clarity, nOTR, and nWVTR measured from barrier plaques.

| Sample | Haze (%) | Clarity (%) | nOTR ($cm^3 \cdot mil$ $m^{-2}$ $day^{-1}$ $(0.209\ atm)^{-1}$) | nWVTR ($g \cdot mil \cdot m^{-2} \cdot day^{-1}$) |
|---|---|---|---|---|
| Control | 101 ± 1 | 60.7 ± 8.6 | 462 | 4.85 |
| Calcium t-butylphosphonate | 80.3 ± 1.1 | 93.3 ± 0.2 | 221 | 2.00 |

As can be seen from the data in Tables 3 and 4, the salt of a branched alkyl phosphonic acid (specifically, calcium t-butylphosphonate monohydrate) is a particularly effective nucleating agent for the HDPE resin. The analysis of the ISO shrinkage plaques shows an increase in the polymer crystallization temperature, which is indicative of the nucleation of the HDPE by the calcium t-butylphosphonate. Moreover, the transverse direction shrinkage of the plaque was dramatically lowered by the calcium t-butylphosphonate. This extremely low TD shrinkage is indicative of very strong lamellar growth in the transverse direction of the plaque. Such in-plane lamellar growth is believed to lead to decreased permeability of the plaque since the crystalline lamellae create a more tortuous path perpendicular to their growth direction. Indeed, this decreased permeability is borne out by the differences in nOTR and nWVTR observed for the barrier plaques. The plaques made with the HDPE resin nucleated with calcium t-butylphosphonate exhibited an nOTR and an nWVTR that are approximately 53% and 59% lower, respectively, than the control film. The dramatic decreases in barrier are again accompanied by an appreciable reduction in haze and an increase in clarity. This combination of increased barrier and improved optical properties make the polymers nucleated with the salt of a branched alkyl phosphonic acid particularly attractive for packaging materials.

Example 4

This example demonstrates the production of polymer compositions according to the invention and the improved properties exhibited by blown films made from such polymer compositions.

A masterbatch composition was made by combining 48.0 g of calcium t-butylphosphonate monohydrate ("CaTBP"), 24.0 g zinc stearate, 8.0 g DHT-4V, 0.60 g Irganox® 1010 primary antioxidant, 1.4 g Irgafos® 168 secondary antioxidant, and 1918 g granular Sclair 2908 HDPE (density of 961 $kg/m^3$ and MFI 7.0 dg/min) as polymer carrier. The above components were combined and high intensity mixed in a 10-liter Henschel mixer for 2.5 minutes at 2,000 rpm. The mixture was then twin screw compounded with a Leistritz 18-mm corotating twin screw extruder equipped with a strand pelletizer. The barrel temperature zones were set from 145-155° C., with a screw speed of 500 rpm and a feed rate of 3.0 kg/hr. The resulting masterbatch contained 2.4 weight percent calcium t-butylphosphonate monohydrate and is referred as "CaTBP Masterbatch."

A hydrocarbon resin masterbatch composition was made by combining 2400 g of OPPERA PR100A hydrocarbon resin, 1.2 g DHT-4V, 1.2 g Irganox® 1010 primary antioxidant, 3.6 g Irgafos® 168 secondary antioxidant, and 3,594 g granular Nova Sclair 2908 HDPE as polymer carrier. The components were combined and high intensity mixed in a 30-liter Henschel mixer for 2.0 minutes at 1,200 rpm. The mixture was then twin screw compounded with a Leistritz 27-mm corotating twin screw extruder equipped with a strand pelletizer. The barrel temperature zones were set from 140-150° C., with a screw speed of 400 rpm and a feed rate of 15.0 kg/hr. The resulting masterbatch contained 40.0 weight percent PR100A and is referred to hereafter as "PR100A Masterbatch." The technical data sheet of the PR100A hydrocarbon resin lists the softening point as 137.7° C. The glass transition temperature was determined by differential scanning calorimetry as approximately 85° C.

Monolayer blown films were made by dry blending Nova Sclair 19C (having a density of 958 $kg/m^3$ and an MFI of 0.95 dg/min), Sclair 2908, processing aid 10476-11 described above ("PPA MB"), and the other components indicated in Table 5 below. The dry blend was fed directly to the hopper of a Labtech Engineering monolayer blown film line as described in Example 2 above. The extruder zones were ramped to 200° C., with the transfer and die zones at the same temperature. Films were made at nominal two mils thickness with a feed rate of 5.0 kg/hr, and a frost line height of 13 cm.

The WVTR and OTR of the resulting films was measured as described above in Examples 1 and 2. These results were again normalized to measured film thickness, to account for minor thickness variations and enable more direct comparison.

TABLE 5

| Composition of blown films. | | | | | | | |
|---|---|---|---|---|---|---|---|
| Film | Sclair 19C (%) | Sclair 2908 (%) | PPA MB (%) | CaTBP MB (%) | CaTBP (ppm) | PR100A MB (%) | PR100A (%) |
| 4-1 | 72.80 | 24.20 | 3.00 | — | — | — | — |
| 4-2 | 72.80 | 21.70 | 3.00 | 2.50 | 600 | — | — |
| 4-3 | 69.89 | 14.73 | 2.88 | 2.50 | 600 | 10.00 | 4.00 |
| 4-4 | 68.43 | 11.25 | 2.82 | 2.50 | 600 | 15.00 | 6.00 |

TABLE 6

| Barrier properties (nWVTR and nOTR) of Films 1-4. | | | | |
|---|---|---|---|---|
| Film | nWVTR (g · mil · $m^{-2}$ · $day^{-1}$) | nWVTR decrease (%) | nOTR ($cm^3$ · mil $m^{-2}$ $day^{-1}$ $(0.209\ atm)^{-1}$) | nOTR decrease (%) |
| 4-1 | 4.19 | — | 2491 | — |
| 4-2 | 1.83 | 56 | 1103 | 56 |
| 4-3 | 1.60 | 62 | 841 | 66 |
| 4-4 | 1.51 | 64 | 781 | 69 |

As can be seen from the data in Tables 5 and 6, the addition of 600 ppm of calcium t-butylphosphonate monohydrate (CaTBP) produced a film that exhibited a 56% decrease in both nWVTR and nOTR relative to the control film. As noted above, this reduction in nWVTR and nOTR is significant. However, the data shows that the nWVTR and nOTR can be further reduced by the addition of a hydrocarbon resin. Indeed, the improved barrier properties resulting from the addition of a hydrocarbon resin is particularly pronounced for the oxygen transmission rate, which was reduced by an additional 13% when only 6 wt. % of the hydrocarbon resin was added.

Example 5

This example demonstrates the production of polymer compositions according to the invention and the improved properties exhibited by blown films made from such polymer compositions.

A 2,000 gram total mixture containing 1.0% calcium t-butylphosphonate monohydrate and 0.50% zinc stearate in granular ExxonMobil LL 1002.09 LLDPE resin (density of 918 kg/$m^3$ and MI of 2.0 dg/min) was mixed for 2.5 minutes at 2,000 rpm in a 10-liter Henschel high intensity mixer. The mixture was compounded with an 18-mm corotating twin screw extruder with barrel temperature setpoints from 155-165° C. The resulting nucleating agent masterbatch was then dry blended at 6.0% into ExxonMobil LL 1001X31 (a butene LLDPE having a density of 918 kg/$m^3$ and an MFI of 1.0 dg/min), along with 3.0% of processing aid 10476-11 described above. This dry blend was compounded with the same extruder and profile as for the masterbatch.

The compounded resin produced above was then converted into a 1.9-mil blown film with a Labtech Engineering lab monolayer unit as described in Example 2 above. The extruder zones were ramped to 200° C., with all transfer line/die zones also at 200° C. The blow-up ratio was 2.5, the run rate was 4.1 kg/hr, and the frost line height was 14 cm.

A control sample was generated with a "blank" masterbatch (everything as for the nucleating agent masterbatch except that no calcium t-butylphosphonate monohydrate or zinc stearate were added). This blank MB was carried through all other preparations described above to also generate a 1.9-mil film.

OTR of the resulting films was measured per ASTM D 3985 (dry, 23° C.) with a 100% oxygen insult on a Systech Illinois Model 8001 oxygen permeation analyzer. Results were normalized to 1.0-mil thickness to account for minor thickness differences in the films. Thus, the units for normalized OTR (nOTR) are $cm^3$·mil $m^{-2}$ $day^{-1}$ $(atm\ O_2)^{-1}$.

The nOTR of the film made with the "blank" masterbatch (containing no salt of a branched alkyl phosphonic acid) was 8,067 $cm^3$·mil $m^{-2}$ $day^{-1}$ $(atm\ O_2)^{-1}$. The nOTR of the film made with the branched alkyl phosphonic acid was 5,025 $cm^3$·mil $m^{-2}$ $day^{-1}$ $(atm\ O_2)^{-1}$. This approximately 38% reduction in the nOTR is significant and shows that salts of branched alkyl phosphonic acids (particularly, calcium t-butylphosphonate monohydrate) can also nucleate linear low-density polyethylene polymers.

Example 6

This example demonstrates the production of polymer compositions according to the invention and the improved properties exhibited by blown films made from such polymer compositions. Specifically, this example demonstrates the effect of the BET specific surface area on the nucleation performance of the salt of a branched alkyl phosphonic acid.

Six samples of calcium t-butylphosphonate monohydrate having different BET specific surface areas (Samples 6-1 to 6-6) were evaluated as nucleating agents for a blend of HDPE resins. Specifically, 600 ppm of each sample was used to nucleate a blend of Sclair 19C (from Nova Chemicals) and DMDA 8007 (from Dow Chemical) similar to that described in Example 2 above. The nucleated HDPE blends were also converted into monolayer blown films in similar fashion to that described in Example 2 above.

The BET specific surface area of the nucleating agent samples was measured in accordance with ISO Standard 9277:2010, which is entitled "Determination of the Specific Surface Area of Solids by Gas Adsorption—BET method," using nitrogen as the adsorbing gas. The nOTR and nWVTR of selected films was measured as described above in Examples 1 and 2.

TABLE 7

| BET specific surface areas of Samples 6-1 to 6-6 and nOTR and nWVTR of HDPE blown films made with Samples 6-1 to 6-6. | | | |
|---|---|---|---|
| Sample | BET Surface Area ($m^2$/g) | nOTR ($cm^3$ · mil $m^{-2}$ $day^{-1}$ $(0.209\ atm)^{-1}$) | nWVTR (g · mil · $m^{-2}$ · $day^{-1}$) |
| Control | — | 744 | 5.45 |
| 6-1 | 23.58 | 215 | 1.84 |
| 6-2 | 32.69 | 195 | — |
| 6-3 | 39.06 | 189 | — |
| 6-4 | 42.17 | 192 | — |
| 6-5 | 46.64 | 186 | — |
| 6-6 | 58.74 | 185 | 1.58 |

As can be seen from the data in Table 7, all of the films containing a salt of a branched alkyl phosphonic acid (specifically, calcium t-butylphosphonate monohydrate) exhibited dramatically improved barrier compared to the control HDPE film. The data demonstrate that all these salts were highly effective nucleating agents for the HDPE resin blend. However, the data also show that, as the BET specific surface area of the salt increases, the salt better nucleates the HDPE resin blend. This is evident from the inverse relationship between the BET specific surface area of the salt and the nOTR of the film made with the salt.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A polymer composition comprising:

(a) a polyethylene polymer composition having a Melt Relaxation Index of 2 or greater; and (b) a salt of a branched alkyl phosphonic acid, wherein the branched alkyl phosphonic acid comprises a branched alkyl group selected from the group consisting of tert-butyl, tert-pentyl, and neopentyl.

2. The polymer composition of claim 1, wherein the polyethylene polymer composition has a density of about 930 $kg/m^3$ to about 970 $kg/m^3$.

3. The polymer composition of claim 1, wherein the polyethylene polymer composition has a molecular weight distribution, and the molecular weight distribution has two or more local maxima.

4. The polymer composition of claim 1, wherein the salt of the branched alkyl phosphonic acid comprises one or more cations selected from the group consisting of Group 1 element cations, Group 2 element cations, and Group 12 element cations.

5. The polymer composition of claim 4, wherein the salt of the branched alkyl phosphonic acid comprises a Group 2 element cation.

6. The polymer composition of claim 5, wherein the salt of the branched alkyl phosphonic acid comprises a calcium cation.

7. The polymer composition of claim 1, wherein the salt of the branched alkyl phosphonic acid is a salt of tert-butylphosphonic acid.

8. The polymer composition of claim 7, wherein the salt of the branched alkyl phosphonic acid is the calcium salt of tert-butylphosphonic acid.

9. The polymer composition of claim 1, wherein the salt of the branched alkyl phosphonic acid has a BET specific surface area of about 20 $m^2/g$ or more.

10. The polymer composition of claim 9, wherein the salt of the branched alkyl phosphonic acid has a BET specific surface area of about 30 $m^2/g$ or more.

11. The polymer composition of claim 1, wherein the salt of the branched alkyl phosphonic acid is present in the polymer composition in an amount of about 50 parts-per-million to about 2,000 parts-per-million, based on the total weight of the polymer composition.

12. A polyethylene film comprising (i) a high-density polyethylene polymer composition having a density of about 930 $kg/m^3$ to about 980 $kg/m^3$ and a Melt Relaxation Index of 2 or greater and (ii) a salt of a branched alkyl phosphonic acid, wherein the branched alkyl phosphonic acid comprises a branched alkyl group selected from the group consisting of tert-butyl, tert-pentyl, and neopentyl.

13. The polyethylene film of claim 12, wherein the film has a normalized oxygen transmission rate (nOTR) of about 300 $cm^3 \cdot mil\ m^{-2}\ day^{-1}\ (0.209\ atm)^{-1}$ or less.

14. The polyethylene film of claim 12, wherein the film has a normalized water vapor transmission rate (nWVTR) of about 3 g mil m 2 day 1 or less.

15. The polyethylene film of claim 12, wherein the film has a haze of about 20% or less at a thickness of about 3 mils.

16. The polyethylene film of claim 12, wherein the film has a clarity of about 90% or greater at a thickness of about 3 mils.

17. The polyethylene film of claim 12, wherein the film has a gloss of about 80% or greater.

18. The polyethylene film of claim 12, wherein the high-density polyethylene polymer composition has a molecular weight distribution, and the molecular weight distribution has two or more local maxima.

* * * * *